United States Patent [19]

Igashira et al.

[11] Patent Number: 4,784,102
[45] Date of Patent: Nov. 15, 1988

[54] FUEL INJECTOR AND FUEL INJECTION SYSTEM

[75] Inventors: Toshihiko Igashira, Toyokawa; Yasuyuki Sakakibara, Nishio; Kazuhide Watanabe, Toyohashi; Masahiro Takigawa, Nukata; Toru Yoshinaga, Okazaki; Yukihiro Natsuyama, Anjo; Shigeki Daido, Nukata, all of Japan

[73] Assignee: Nippon Soken, Inc., Nishio, Japan

[21] Appl. No.: 813,463

[22] Filed: Dec. 24, 1985

[30] Foreign Application Priority Data

Dec. 25, 1984 [JP] Japan ............................. 59-271782
Sep. 4, 1985 [JP] Japan ............................. 60-193918
Nov. 1, 1985 [JP] Japan ............................. 60-244126

[51] Int. Cl.$^4$ ..................................... F02M 39/00
[52] U.S. Cl. ................................... 123/447; 173/446; 173/467; 173/498
[58] Field of Search ............... 123/446, 447, 467, 498, 123/500, 501, 456, 472

[56] References Cited

U.S. PATENT DOCUMENTS

| Re. 723,896 | 4/1985 | Igashira et al. | |
|---|---|---|---|
| 2,892,459 | 6/1959 | Stoll | 123/456 |
| 3,392,714 | 7/1968 | Braon | 123/456 |
| 3,431,900 | 3/1969 | Jackson | 123/456 |
| 3,908,621 | 9/1975 | Hussey | 123/462 |
| 4,499,878 | 2/1985 | Igashira | 123/498 |
| 4,550,744 | 11/1985 | Igashira | 123/447 |
| 4,572,136 | 2/1986 | Takeuchi | 123/447 |
| 4,610,427 | 9/1986 | Igashira et al. | 123/447 |

FOREIGN PATENT DOCUMENTS

| 0152161 | 9/1983 | Japan | 123/498 |
|---|---|---|---|
| 0099061 | 6/1984 | Japan | 123/447 |

OTHER PUBLICATIONS

Akagi et al, "A New Accumulator Fuel Injection System for Direct Injection Diesel Engines", from Diesel Combustion and Emissions Research Report SP525 SAE, Sep. 1982, pp. 61-69.

Primary Examiner—Carl Stuart Miller
Attorney, Agent, or Firm—Cushman, Darby & Cushman

[57] ABSTRACT

A fuel injection system in which a fuel injector having a fuel pressure control chamber formed therein to create a pressure which forces a needle valve in the closing direction to open and close the nozzle hole, an accumulator to retain fuel discharged from the nozzle hole, and a fuel injector provided at each of the cylinders of the engine, are connected to the fuel injection pump by a single piping system without utilizing a special distribution mechanism. The volume of the fuel pressure control chamber in the fuel injector can be changed by a piezo-actuator. A check valve is provided at a half way point of the piping which leads the fuel fed under pressure from the fuel injection pump to the fuel injector into the fuel pressure control chamber and the accumulator, so that the fuel is fed through the check valve into the fuel pressure control chamber and the accumulator.

25 Claims, 14 Drawing Sheets

FUEL INJECTOR AND FUEL INJECTION SYSTEM

BACKGROUND OF THE INVENTION

1. Field of the Invention

The present invention relates to a fuel injector intended for use in an internal combustion engine, especially in a Diesel engine. More particularly, it relates to an accumulator nozzle type fuel injector and a fuel injection system provided with the same.

2. Description of the Related Art

In the conventional accumulator nozzle type fuel injector, the pressure of fuel supplied from a fuel source does not act on the needle valve in the valve-closing direction but acts only in the valve-opening direction, with the force of a spring acting in the valve-closing direction. In addition, the needle valve is so arranged that when the supply of fuel is stopped, the valve opens to allow fuel to be injected from the nozzle hole so that the fuel pressure within the accumulator is reduced, and thus the needle valve can close, terminating the fuel injection.

In the conventional fuel injector having the above construction, the valve-closing pressure depends upon the force (i.e., size) of the spring, and thus the size of the fuel injector is necessarily limited. Accordingly, since the needle valve can be opened under a relatively low pressure, a sufficient fuel injection pressure cannot be obtained. In other words, fuel atomization is limited and it is difficult to further improve the engine performance. Also, the conventional fuel injector is so constructed that the needle valve is opened when the fuel supply is stopped, and is closed as the fuel pressure within the accumulator decreases; therefore, the operating noise is loud, since the fuel injection time is extremely short and thus the needle is opened and closed rapidly and abruptly.

To minimize this noise, the fuel injection rate of the internal combustion engine should be controlled in accordance with the running conditions of the engine. This fuel injection rate control must be such that the injection rate is low in the low-speed, low-load domain of the engine and is high in the high-speed, high-load domain.

SUMMARY OF THE INVENTION

Accordingly, the primary object of the present invention is to provide a fuel injector which will improve the engine performance by creating a sufficiently high fuel injection pressure and will minimize the engine running noise by enabling a pilot injection which will obviate the abrupt movement of the needle.

Another object of the present invention is to provide a fuel injector which eliminates the need for a mechanism to distribute fuel to the above-mentioned fuel injector provided at each of the cylinders of a multi-cylinder internal combustion engine, permitting the construction of the fuel injection pump to be simplified.

According to the present invention, a fuel injector is provided which comprises a housing, a piezo-actuator, a needle valve, a check valve, and an electric circuit controlling the voltage applied to the piezo-actuator. Formed within the housing are a fuel pressure control chamber and an accumulator, which temporarily retains the fuel, a path permitting the fuel fed intermittently under pressure from a fuel source to be fed into the fuel pressure control chamber and accumulator, and a nozzle hole through which the fuel in the accumulator is injected. The piezo-actuator is accommodated in the housing and defines the fuel pressure control chamber, and expands and contracts according to the voltage applied thereto, thereby changing the volume of the fuel pressure control chamber. The needle valve is provided reciprocally movably within the housing, and under pressure from the fuel pressure control chamber and accumulator, opens or blocks communication between the accumulator and the nozzle hole. The check valve normally opens and closes communication between the path and the fuel pressure control chamber, and between the path and accumulator, in accordance with the pressure in the path and/or fuel pressure control chamber. The fuel supplied from the fuel source passes through the path and is fed under pressure into the fuel pressure control chamber and accumulator via the check valve. The needle valve blocks communication between the accumulator and the nozzle hole when the fuel pressure in the fuel pressure control chamber is relatively high, by the action of the piezo-actuator, and opens communication between the accumulator and nozzle hole when the fuel pressure in the fuel pressure control chamber is relatively low, also by the action of the piezo-actuator, thus allowing fuel to be injected from the nozzle hole.

Also, according to the present invention, a fuel injection system is provided which comprises a fuel injection pump discharging a predetermined amount of the fuel, a plurality of fuel injectors provided at each corresponding cylinder of a multi-cylinder internal combustion engine and retaining under high pressure fuel supplied from the fuel injection pump, and injecting the high-pressure fuel, a fuel pipe-line divided at a half-way point into a number of branches corresponding to the number of cylinders, one end thereof being connected to the discharge port of the fuel injection pump and each branched end thereof being connected to each of the fuel injectors, means provided at the half-way point of the fuel pipe-line to control the fuel pressure inside the fuel pipe-line, and means of opening the fuel injector to inject the high pressure fuel.

BRIEF DESCRIPTION OF THE DRAWINGS

The present invention may be more fully understood from the ensuring description, made by way of example, of the preferred embodiments of the invention with reference to the drawings, in which;

FIGS. 18a to 18d show the expansion/contraction actions in the embodiment shown in FIG. 16, in which:

FIG. 18a is a graph showing the pressure within the fuel pipe-line;

FIG. 18b is a graph showing the drive signals for the piezo-actuator;

FIG. 18c is a graph showing the pressure within the accumulator nozzle; and

FIG. 18d is a graph showing the injection rate;

FIGS. 19a to 19d show the expansion/contraction actions in an embodiment of the present invention in which a distribution type fuel injection pump is adopted, in which:

FIG. 19a is a graph showing the pressure within the fuel pipe-line;

FIG. 19b is a graph showing the drive signals for the piezo-actuator;

FIG. 19c is a graph showing the pressure within the accumulator nozzle; and

FIG. 19d is a graph showing the injection rate; and

DESCRIPTION OF THE PREFERRED EMBODIMENTS

Figure 1:
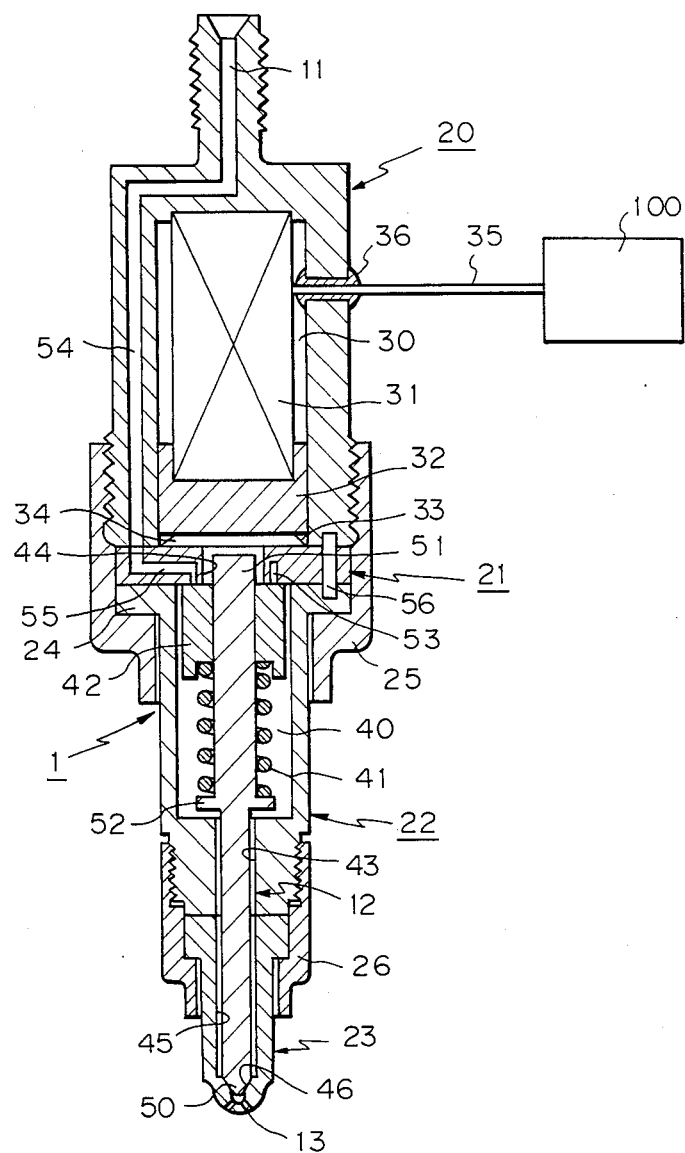
FIG. 1 is a sectional view of a first embodiment according to the invention.

Referring to FIG. 1, one embodiment of the accumulator nozzle type fuel injector of the present invention is indicated generally by reference numeral 1. This accumulator nozzle 1 is intended for injecting fuel into the combustion chamber of a direct-injection Diesel engine and therefore, one nozzle 1 is provided at each cylinder. Namely, for a 4-cylinder engine, for example, four accumulator nozzles are provided. The fuel fed under pressure from a well-known in-line pump (not shown) flows from an inlet port 11 into the accumulator nozzle 1 and is injected from a nozzle hole 13 by the opening/closing action of a needle valve 12, as will be described later. The fuel pumping operation by the injection pump is not carried out as is usual near the top dead center (TDC) of each cylinder, but has already been completed sufficiently before TDC, for example, at a crank angle of 60 degrees before TDC. The amount of fuel fed by one pumping operation is adjusted according to the setting of the angle of the lever of the injection pump, as in the conventional technique.

The housing of the accumulator nozzle 1 consists of a piezo-actuator holder 20, distance piece 21, nozzle holder 22, and nozzle body 23. The piezo-actuator holder 20 has a cylindrical-shaped bottom, with the distance piece 21 located at the opening thereof and the nozzle holder 22 located at the side opposite to the distance piece 21 relative to the piezo-actuator holder 20. The nozzle holder 22 is provided with a flange 24 that is closely fitted to the distance piece 21. The nozzle holder 22, distance piece 21, and piezo-actuator holder 20 are coupled together by a threaded retainer 25. Similarly, the nozzle body 23 is coupled to the end of the nozzle holder 22 by another threaded retainer 26.

Formed in the piezo-actuator holder 20 is a bore 30 which accommodates a piezo-actuator 31, a piston 32, and a belleville spring 33. The upper end of the piezo-actuator 31 is fixed to the bottom of the bore 30, and the piston 32 is coupled to the bottom end thereof. The outside diameter of the piezo-actuator 31 is smaller than the inside diameter of the bore 30, and the piston 32 has a diameter generally the same as that of the bore 30, so that the piston 32 is slidably supported in the bore 30. The belleville spring 30 is located between the bottom face of the piston 32 and the top face of the distance piece 21, thus always forcing the piston 32 upward until the piston 32 abuts against the piezo-actuator 31. A fuel pressure control chamber 34 is defined between the bottom face of the piston 32 and the top face of the distance piece 21. The volume of the fuel pressure control chamber 34 is reduced when the piezo-actuator 31 expands and depresses the piston 32 against the force of the belleville spring 33, and is increased when fuel is supplied under a pressure high enough to force the piezo-actuator 31 to contract.

The piezo-actuator 31 is a cylindrical laminate stack formed by piezoelectric (PZT) disks having a diameter of 15 mm and a thickness of 0.5 mm and copper disks having a diameter of 15 mm and a thickness of 0.01 mm, stacked alternately on top of each other (not shown in the drawing). A lead wire 35 is connected to the copper disks so that a voltage can be applied to the PZT elements in parallel with the direction of thickness of each PZT element. The lead wire 35 is extended through a grommet 36 outside of the piezo-actuator holder 20 and forms a portion of an electric circuit 100, which will be described later. The PZT elements are made of a sintered ferroelectric ceramic containing zircon titanate as the base; this is a typical element having a piezoelectric effect. The physical properties of this element are such that when a voltage of 500 V is applied in the direction of the thickness thereof, the thickness of the element is increased by 0.5 $\mu$m, and when the voltage of 500 V is short-circuited, the thickness will be reduced by 0.5 $\mu$m. Also when a pressure of 200 kg/cm$^2$ is applied to the element in the direction of the thickness thereof, a voltage of 200 V is developed in that direction. In this embodiment, the piezo-actuator 31 has one hundred PZT elements electrically connected in parallel to each other, so that when a voltage of 500 V is applied to the piezo-actuator 31, it will be expanded by 50 $\mu$m.

A needle valve 12 is provided vertically displaceably in the stepped space defined by the nozzle holder 22 and nozzle body 23, and a spring 41 and check valve 42 are provided in a large diameter bore 40 formed in the nozzle holder 22. The large diameter bore 40 is formed under the distance piece 21, and a small diameter bore 43 is formed in the nozzle holder 22 as a continuation of the large diameter bore 40. The large diameter bore 40 communicates with the control oil pressure chamber 34 through a communication hole 44 formed in the distance piece 21. The small diameter bore 43 has the same diameter as a small diameter bore 45 formed in the nozzle body 23 and communicates with this bore 45. Thus, the above-mentioned stepped space is defined by the large diameter bore 40 and small diameter bores 43, 45. Formed at the bottom end of the small diameter bore 45 in the nozzle body 23 is a conical seat surface 46 tapered downward. The nozzle body 23 also has a single or multiple nozzle hole(s) 13 in the portion thereof under the conical seat surface 46.

The bottom end 50 of the needle valve 12 is formed in the shape of a cone and can be closely fitted on the seat surface 46, whereby the nozzle hole 13 can be isolated from the small diameter bore 45. When the bottom end 50 separates from the seat furface 46, the nozzle hole 13 is communicated with the small diameter bore 45. The needle valve 12 extends straight upward and the top end 51 thereof is always fitted in the communication hole 44 in the distance piece 21. A flange-shaped spring seat 52 is formed close to the center of the needle valve 12 and near the bottom end face of the large diameter bore 40. The cylindrical check valve 42 is slidably fitted in the upper portion of the needle valve 12. The coil spring 41 is fitted around the outer circumference of the needle valve 12, with the top end thereof engaging the bottom face of the check valve 42, and the bottom end thereof engaging the top face of the spring seat 52. Thus, the spring 41 separates the check valve 42 and spring seat 52 by forcing them in opposite directions. Therefore, when the engine is not in operation, the check valve 42 rests on the bottom face of the distance piece 21 and the needle valve 12 is forced downward, so that the bottom end 50 thereof is seated on the seat surface 46. The outside diameter of the check valve 42 has a radius of about 0.2 mm smaller than the inside diameter of the large diameter bore 40, and the inside diameter of the check valve 42 has a radius of about 0.2 $\mu$m larger than the outside diameter of the needle valve 12.

As will be described later, the check valve 42 receives the pressure of the fuel supplied from the path 54 formed in the piezo-actuator holder 20, and accordingly, is moved downward, compressing the spring 42, so that fuel under a high pressure is fed to the large diameter bore 40 and retained therein until it is injected from the nozzle hole 13. Thus, the large diameter bore 40 defines an accumulator for retaining the high-pressure fuel therein.

The communication hole 44 in the distance piece 21 has a radius about 0.5 mm larger than the top end 51 of the needle valve 12, so that the fuel pressure in the fuel pressure control chamber 34 always acts on the top face of the check valve 42. Provided in the outer circumference of the communication hole 44 is an annular recess 53 concentric with the communication hole 44. The annular recess 53 is formed in the bottom face of the distance piece 21, and has an inside radius about 1 mm larger than the inside diameter of the communication hole 44, and an outside radius about 1 mm smaller than the outside diameter of the check valve 42. Therefore, when the check valve 42 fits closely to the bottom face of the distance piece 21, the opening side of the annular recess 53 is fully closed by the check valve 42. The annular recess 53 communicates with a path 55 formed in the radial direction of the distance piece 21. The path 55 is arranged so as to communicate with a path 54 formed axially in the side wall of the piezo-actuator holder 20, and the distance piece 21 is positioned by means of a knock pin with respect to the piezo-actuator holder 20 and nozzle holder 22. Thus fuel entering the inlet port 11 is fed to the annular recess 53 through the paths 54 and 55.

Figure 2:
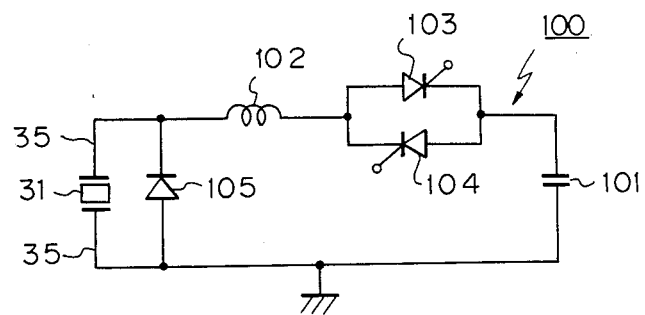
FIG. 2 is a circuit diagram of the electric circuit in the first embodiment according to the present invention.

FIG. 2 shows an electric circuit 100 which controls the voltage to be applied to the piezo-actuator 31.

The circuit 100 serves basically to provide an electrical charge exchange between the piezo-actuator 31 and a capacitor 101. Namely, the charge in the piezo-actuator 31 is shifted into the capacitor 101 through a coil 102 and thyristor 103, and the charge in the capacitor 101 is shifted into the piezo-actuator 31 through a thyristor 104 and the coil 102. If the fuel pressure in the fuel pressure control chamber 34 drops after the charge in the piezo-actuator 31 is shifted into the capacitor 101, the piezo-actuator 31 may possibly be degraded since a voltage opposite to that for polarization is developed in the piezo-actuator 31. A diode 105 is provided to prevent the application of such a reverse voltage.

The operation of the above embodiment according to the present invention will now be described.

When a piston in a cylinder of an engine (none of which are shown) reaches a crank angle of 90° before the TDC, a corresponding pump unit of the in-line pump starts to discharge the fuel to the accumulator nozzle 1 installed at the cylinder. The fuel thus discharged arrives at the inlet port 11 of the accumulator nozzle 1 through an injection steel pipe (not shown), and passes via the paths 54 and 55 to the annular recess 53 in the distance piece 21. At this stage, the annular recess 53 is closed by the check valve 42 under the pressure of the spring 41. The fuel fed under pressure forces the check valve 42 open and flows into the large diameter bore 40, which acts as an accumulator, and into the fuel pressure control chamber 34 through the communication hole 44.

Concerning the fuel pressure acting on the needle valve 12, the area receiving the pressure acting downward is equal to the maximum sectional area of the needle valve 12, and the area receiving the pressure acting upward is the maximum sectional area minus the area occupied by the bottom end 50 of the needle valve 12 resting on the seat surface 46. Therefore, the downward acting component of the pressure acting on the needle valve 12 is larger and the seating of the needle valve 12 is maintained, thus closing the nozzle hole 13. Accordingly, the compressed fuel supplied to the accumulator nozzle 1 flows into the large diameter bore 40 and the fuel pressure control chamber 34 and is held therein in a pressurized state. When the fuel supply from the pump is small, this fuel pressure is in the order of 500 kg/cm$^2$, but can rise to 1000 kg/cm$^2$ when the fuel supply is large. The fuel supply from the pump is terminated at 60° before the TDC, and then the check valve 42 is raised under the resilience of the spring 41 to close the annular recess 53 and block communication between the large diameter bore 40 and fuel pressure control chamber 34. The accumulator nozzle 1 is maintained in this condition until fuel injection occurs.

Figure 3:
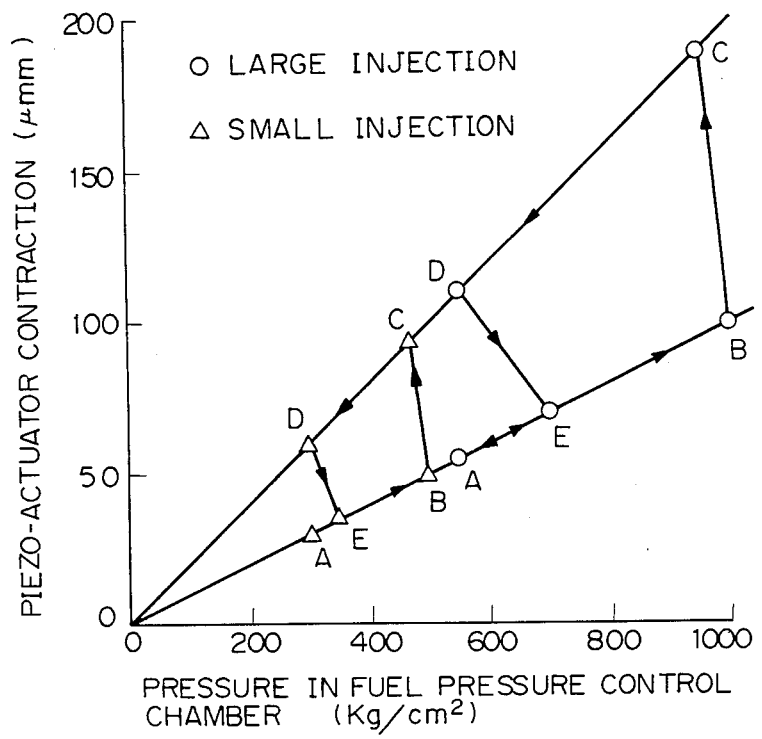
FIG. 3 is a graph showing the relationship between pressure in the fuel pressure control chamber and contraction of the piezo-actuator.
Figure 4:
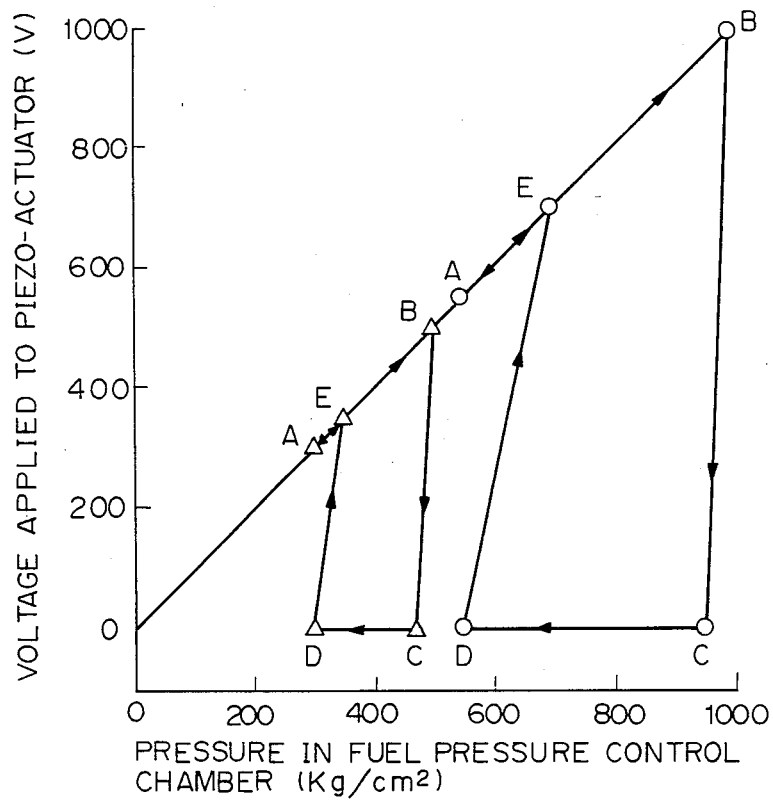
FIG. 4 is a graph showing the relationship between pressure in the fuel pressure control chamber and the voltage to the piezo-actuator.

At this time, the piezo-actuator 31 is forced to contract by the fuel pressure in the fuel pressure control chamber 34, whereby a charge develops in the piezo-actuator 31 to raise the voltage therein. The contraction of the piezo-actuator 31 is indicated at B in FIG. 3, and the voltage at this time is indicated at B in FIG. 4. In both FIG. 3 and FIG. 4, the horizontal axes indicate the fuel pressure in the fuel pressure control chamber 34. Also shown in FIGS. 3 and 4 are two points B. The point B marked with a circle represents the contraction and voltage, respectively, when the fuel supply from the pump is large, and the point B marked with a triangle represents the contraction and voltage, respectively, when the fuel supply from the pump is small. This also holds true for the points C, D, E, and A.

At the timing of injection, for example, at TDC, the thyristor 103 is turned ON, the charge in the piezo-actuator 31 is shifted into the capacitor 101 and the voltage of the piezo-actuator 31 becomes approximately 0 V, as shown at point C in FIG. 4. At the same time, the piezo-actuator is decreased in volume, i.e., contracted. The contraction is increased from the value indicated at point B to the value shown at point C as shown in FIG. 3. Thus, even if the potential in the capacitor 101 exceeds that in the piezo-actuator 21, the charge is still shifted under the action of the coil 102, which operation is well known as L-C resonance. In this L-C resonance, the charge in the capacitor 101 subsequently tends to return to the piezo-actuator 31, and this tendency is utilized to turn OFF the thyristor 103.

As described above, as the piezo-actuator 31 is contracted from point B to point C, as shown in FIG. 3, the volume of the fuel pressure control chamber 34 is increased, and the pressure within the fuel pressure control chamber 34 drops in proportion with the increase in the volume of the fuel pressure control chamber 34. Thus, the upward acting component of the fuel pressure acts on the needle valve 12 causing it to move upwards and open the nozzle hole 13, allowing the fuel in the large diameter bore 40 to be injected into the combustion chamber of the engine. This injection of fuel causes the fuel pressure in the large diameter bore 40 to be reduced, and thus the downward acting component of the fuel pressure acts on the needle valve 12 which, in turn, will move down until it is seated on the seat surface 46, terminating the fuel injection. As the needle valve 12 moves down, the pressure in the fuel pressure control chamber 34 is lowered, and the piezo-actuator 31 is accordingly expanded. Thus, the contraction of the piezo-actuator 31 is decreased from point C toward point D, as shown in FIG. 3, and the pressure in the fuel pressure control chamber 34 is decreased from point C toward the point D, as shown in FIG. 4. Note that when contraction of the piezo-actuator 31 is reduced to the point at which the initial length is restored, the piezo-actuator 31 must be supplied with a charge, and this charge is supplied from the diode 105.

Accordingly, in any engine running condition, the thyristor 104 is turned ON at a timing at which no fuel injection is required, for example, at a crank angle of 60° after TDC. Then, the charge in the capacitor 101 is shifted through the coil 102 into the piezo-actuator 31 which, in turn, will be expanded. As a result, the volume of the fuel pressure control chamber 34 is reduced and thus the fuel pressure therein becomes high. This condition is indicated at point E in FIGS. 3 and 4. Note that the non-coincidence between the points E and B is due to the loss resulting from the charge shift.

Thus, when the expansion of the piezo-actuator 31 causes the pressure in the fuel pressure control chamber 34 to exceed that in the large-diameter bore 40, the check valve 42 moves down to bring the fuel pressure control chamber 34 into communication with the annular recess 53, thus allowing the oil pressure in the fuel pressure control chamber 34 to be relieved to the injection pump (not shown). When the pressure in the fuel pressure control chamber 34 is substantially equal to that in the large diameter bore 40, the check valve 42 closes the annular recess 53 under the force of the spring 41. This condition is indicated at point A.

Then, when the piston reaches a crank angle of 90° before TDC, the fuel is fed under pressure from the injection pump, resulting in the condition shown at point B. These operations are subsequently repeated in the sequence B→C→D→E→A.

The first embodiment according to the present invention has the following advantages:

1 The conventional in-line pump can be used as usual, but the fuel injection timing can be electronically controlled.
2 Since the piezo-actuator 32 is used to open the accumulator nozzle 1, value opening and closing operations are rapidly carried out as required.
3 Since the piezo-actuator 31 is driven by the voltage developed in the actuator itself, provision of a special drive power source is not necessary.
4 Since the needle valve 12 is seated by the fuel pressure, the pressure for closing the valve can be high even if the spring force is weak.
5 As seen from FIG. 3, the larger the injection amount, the higher can be the injection starting and ending pressures, which is very desirable for improving the engine performance.

Figure 5:
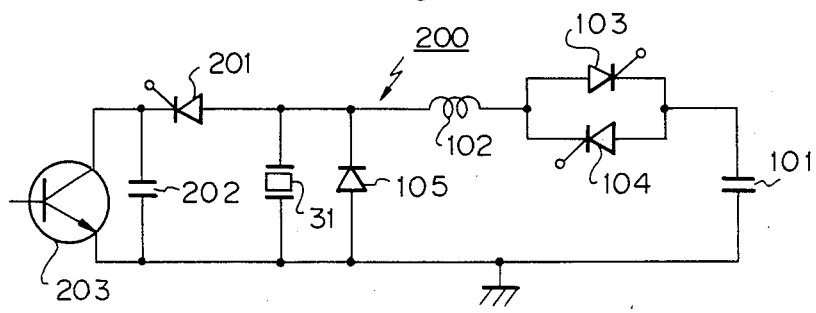
FIG. 5 is a circuit diagram showing the electric circuit in a second embodiment according to the present invention.

FIG. 5 shows an electric circuit for use in a second embodiment according to the invention. The construction and the other elements of this second embodiment are the same as those of the first embodiment, except that in this second embodiment, the accumulator nozzle 1 is caused to provide a pilot injection. That is to say, before the fuel injection proper, a small amount of fuel is injected to suppress any abrupt change in the fuel injection amount and thus minimize engine noise.

For this pilot fuel injection, the electric circuit 200 of the second embodiment comprises, in addition to the electric circuit 100 of the first embodiment, a thyristor 201, a capacitor 202, and a transistor 203. The thyristor 201 serves to discharge a part of the charge in the piezo-actuator 31 to the capacitor 202, and the transistor 203 is provided down-stream of the thyristor 201 to adjust the terminal voltage of the capacitor 202.

The operation of the second embodiment having the above electric circuit 200 is as follows.

Assume that the accumulator nozzle 1 is supplied with fuel from the injection pump and maintained in a closed state. When the piston reaches a crank angle of 10° before TDC, the thyristor 201 is turned ON and a very small part of the charge in the piezo-actuator 31, equivalent to at most several tens of volts in voltage drop, in released into the capacitor 202. As the result, a small amount of the fuel proportional to the voltage drop is injected as a pilot injection. Thereafter, when the piston arrives at TDC, the thyristor 103 is turned ON and the main injection carried out. The main injection is effected in the same manner as in the first embodiment. Thereafter, the charge in the capacitor 202 is released by the transistor 203 by a subsequent fuel injection. At this time, the transistor 203 discharges the terminal voltage of the capacitor 202 in such a manner that when the thyristor 201 is turned ON, the voltage of the piezo-actuator 31 drops to a set value.

Figure 6:
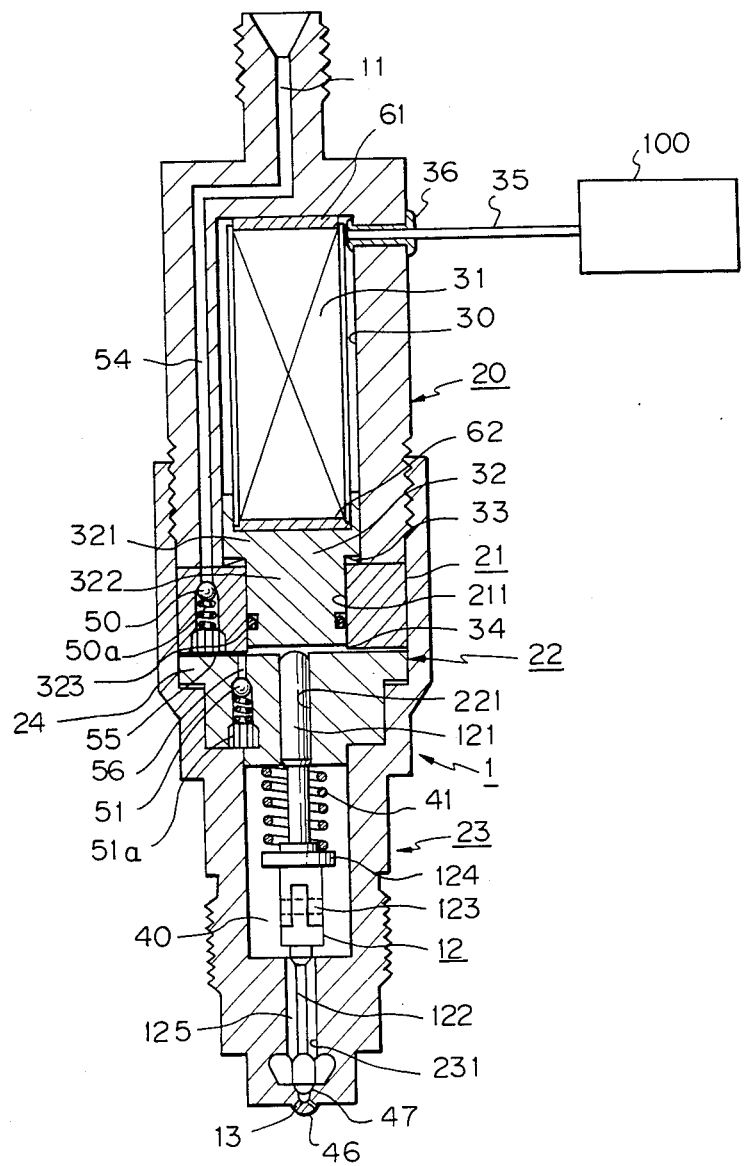
FIG. 6 is a sectional view of another embodiment of the fuel injector according to the present invention.

FIG. 6 shows a fuel injector according to another embodiment of the present invention. This fuel injector is provided at each of the cylinders in the same away as the fuel injector shown in FIG. 1.

The housing consists of a piezo-actuator holder 20 holding the piezo-actuator 31, a hollow cylindrical distance piece 21 defining a fuel pressure control chamber 34 serving to control the liquid pressure, as will be described later, a nozzle holder 22 defining the bottom of the fuel pressure control chamber 34 and holding an accumulator nozzle 1, and a hollow cylindrical nozzle body defining an accumulator, as will be explained later, with the bottom end thereof closed. The piezo-actuator holder 20 has one end thereof closed so as to fixedly contain the piezo-actuator 31, and at an opening side of the other end thereof, a distance piece 21 is provided in a face-to-face relationship therewith. At the side of the distance piece 21 opposite to the piezo-actuator holder 20 is provided a nozzle holder 22 opposing and concentric to the distance piece 21. The nozzle holder 22 is provided with a flange 24 closely fitted to the distance piece 21. The nozzle holder 22, distance piece 21, and piezo-actuator holder 20 are integrally coupled together at the outer circumferences thereof by the nozzle body 23. Namely, the nozzle holder 22, distance piece 21, and nozzle holder 20 are integrally coupled with the nozzle body 23 by screwing the nozzle holder 20 into a threaded hole formed in the inner wall of the nozzle body 23.

A bore 30 formed in the piezo-actuator holder 20 accommodates therein the piezo-actuator 31, piston 32, and a belleville spring 33. The top end of the piezo-actuator 31 is fixed to the bottom of the bore 30, namely, to the bottom of the piezo-actuator holder 20, by an insulating plate 61, and the bottom end thereof is coupled in a face-to-face manner with the top face of the piston 32 by an insulating plate 62. The outside diameter of the piezo-actuator 31 is smaller than the inside diameter of the bore 30, to allow for displacement due to the expansion and contraction of the piezo-actuator 31, as will be explained later. The piston 32 consists of a large diameter section 321 having a diameter substantially the same as the inside diameter of the bore 30, and a small diameter section 322 having a diameter smaller than, for example, 15 mm; e.g., 12 mm. Namely, the large diameter section of the piston 32 is slidably accommodated in the bore 30, and the small diameter section 322 is slidably accommodated within a bore 211 in the distance piece 21. As mentioned above, the diameter of the small diameter section 322 is smaller than the inside diameter of the bore 30, namely, the diameter of the piezo-actuator 31, so that when a large stress is applied repeatedly to the piezo-actuator 31, the pressure at the piezo-actuator 31 is reduced, preventing the piezo-actuator from degradation and damage.

The bottom of the distance piece 21 is closely fitted to the nozzle holder 22. The bottom face of the piston 32, the top face of the nozzle holder 22, and the inner wall of the distance piece 21 together define a space in which a fuel pressure control chamber 34 is also defined, the volume of which is varied in accordance with the movement of the piston 32. An O-ring 323 of the piston ring 32 serves to maintain a constant fuel-tight state in the fuel pressure control chamber 34.

A bore 221 is formed around the axis of the nozzle holder 22. In the bore 221 a pressure receiving bar 121 of the needle valve 12 is slidably accommodated to maintain air-tightness. The needle valve 12 consists of this pressure receiving bar 121 and a valve body 122, which are coupled together by a pin 123. The valve body 122 is slidably accommodated in the small diameter bore 231, and a fuel path 125 extending axially of the valve body 122 is formed in the outer circumference thereof. The needle valve 12 is thus divided into two parts, i.e., the pressure receiving bar 121 and the valve body 122, to ensure the slidability of the needle valve 12 within the bore 221 in the nozzle holder 22 and bore 231 in the nozzle body 23, even if the axes of these bores 221 and 231 are slightly offset from each other. A spring 44, which forces the valve body 122 in the valve-closing direction, is provided between a spring guide 124 formed on the pressure receiving bar 121 and the nozzle holder 22.

Formed in the nozzle body 23 is a bore having an inside diameter equivalent to that of the distance piece 21, the bore defining an accumulator 40 in which the needle valve 12 is vertically movably accommodated.

A check valve 50 forced by a spring 50a in the valve-closing direction is provided at the distance piece 21 thereon. When fuel at a predetermined pressure is supplied, the inlet port 11 and fuel pressure control chamber 34 are communicated with each other. The nozzle holder 22 also is provided with a check valve 51 which is forced by a spring 51a in the valve-closing direction. When fuel at a predetermined pressure is supplied, communication is established among the inlet port 11, fuel pressure control chamber 34, and accumulator 40.

The piezo-actuator holder 20, distance piece 21, and nozzle holder 22 are positioned by means of a knock pin (not shown). Accordingly, fuel flowing in the inlet port 11 is fed to the fuel pressure control chamber 34 through the path 54, check valve 50, and the path 55. The fuel is further fed to the accumulator 40 through the path 56 and check valve valve 51.

The volume of the fuel pressure control chamber 34 is reduced when the piezo-actuator 31 is axially expanded and depresses the piston 32 against the force of the belleville spring 33. On the other hand, when the piezo-actuator 31 is contracted or when fuel at a pressure high enough to force the piezo-actuator 31 to contract is supplied to the fuel pressure control chamber 34, the piston 32 is raised by the fuel pressure to force the piezo-actuator to contract and the volume of the fuel pressure control chamber 34 is increased.

The piezo-actuator 34 has the same construction as in the embodiment shown in FIG. 1.

Figure 7:
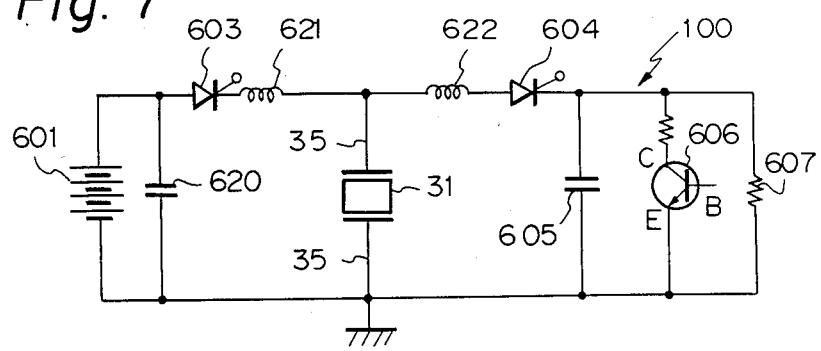
FIG. 7 is a circuit diagram of one embodiment according to the present invention of the electric circuit to control the injection rate of the fuel injector shown in FIG. 6.

FIG. 7 shows an electric circuit 100 for controlling the voltage applied to the piezo-actuator 31, and for controlling the release of the charge accumulated in the piezo-actuator 31.

As seen in FIG. 7, the piezo-actuator 31 is connected to the electric circuit by means of a lead wire 35. The electric circuit 100 consists of a circuit section for applying a voltage to the piezo-actuator 31, including a power source 601, capacitor 620, thyristor 603, and coil 621, a circuit section for releasing the charge accumulated in the piezo-actuator 31, including a coil 622, thyristor 604, capacitor 605, npn transistor 606, and a resistor 607.

The accumulated charge releasing circuitry is intended for control of the amount to be released of the charge accumulated in the piezo-actuator 31. The accumulated charge in the piezo-actuator 31 is shifted into the capacitor 605 through the coil 622 and thyristor 604. The amount of charge to be shifted can be adjusted by adjusting the voltage across the capacitor 605 and changing the turn-ON operation of the npn transistor 606 connected in parallel with the capacitor 605. This control will be described in the explanation of the general operation.

The voltage applying circuitry is for applying a voltage from the power source 601 to the piezo-actuator 31, with the resonance characteristic defined by the capacitor (C) 620 and coil (L) 621, by rendering the thyristor 603 conductive.

The operation of the fuel injection system according to the present invention will now be described.

When a piston in a cylinder of an engine (none of which are shown reaches a crank angle of 90° before TDC, the pump unit (not shown) of an in-line pump (not shown), corresponding to the accumulator nozzle 1 provided on the cylinder, starts to discharge the fuel. The fuel thus discharged passes through an injection steel pipe (not shown) to the inlet port 11 of the fuel injector 1 (accumulator nozzle) and raises the check valve 50 via the path 54. Thus, the fuel under pressure flows through the path 55 into the fuel pressure control chamber 34 and through the path 56 to depress the check valve 56, thus flowing into the accumulator 40.

If a pressure of more than 450 kg/cm$^2$ (more than 800 kg as converted to force) is applied repeatedly to the piezo-actuator 31, which is made of PZT elements, the piezo-actuator 31 may possibly be degraded or damaged. To prevent this, the small diameter section of the piston 32 is made smaller than the outside of the element of the piezo-actuator 31 to reduce the pressure applied to the piezo-actuator 31, as described before. Also, the belleville spring 33 is provided between the bottom face of the large diameter section 321 of the piston 32 and the distance piece 21; it is possible to raise the piston 32 under the force of the spring 33 when the piezo-actuator 31 is contracted. The belleville spring 33 may be provided in the fuel pressure control chamber 34. However, in this embodiment, the belleville spring 33 is provided outside the fuel pressure control chamber 34 since the volume of the fuel pressure control chamber 34 should be kept as small as possible to ensure a better response by the accumulator nozzle 1.

Concerning the fuel pressure acting on the needle valve 12, the area receiving the downward acting component of the pressure is equal to the maximum sectional area of the needle valve 12, and the area in which the upward acting pressure component is received is the maximum sectional area minus an area in which the bottom face of the needle valve 12 occupies the seat surface 47. Therefore, the downward acting component of the pressure acting on the needle valve 12 is larger than the upward acting component. The needle valve 12 is maintained seated by the force of the spring 41, closing the nozzle hole 13. Thus, the fuel fed under pressure to the fuel injection valve 1 flows into the accumulator 40 and fuel pressure control chamber 34, where the fuel is stored under pressure. When the fuel supply from the pump (not shown) is small, the fuel pressure is in the order of 100 kg/cm$^3$, and in the order of 675 kg/cm$^2$ when the fuel supply is large. The fuel supply from the pump is terminated at a crank angle of 60° before TDC. When the fuel supply is ended, the check valve 50 is closed under the resilience of the spring 50a, and similarly the check valve 51 is closed under the action of the spring 51a. Therefore, the path 54 from the inlet port 11 is closed and communication between the fuel pressure control chamber 34 and accumulator 40 is blocked. The fuel injection valve 1 maintains this condition until a subsequent injection operation.

The electric circuit 100 will be described with reference to FIG. 7. When the piston reaches a crank angle of 90° before TDC, the thyristor 603 is rendered conductive and a DC voltage of 300 V is applied from the power source 601 to the piezo-actuator 31 through the coil 621, thus expanding the piezo-actuator 31. In this case, the terminal voltage of the piezo-actuator 31 is raised to about 400 V due to the L-C resonance of the capacitor 620 and coil 621. Thereafter, the thyristor 603 is turned OFF. As the piston proceeds under the action of the pump plunger (not shown) to the fuel feed stroke, the pressure in the fuel pressure control chamber and accumulator 40 is raised. Thus, a charge is developed and accumulated in the accumlator 40 corresponding to that pressure rise. Where the fuel injection amount per stroke of one cylinder is small, for example, 10 mm$^3$/st (stroke), the terminal voltage of the piezo-actuator 31 is raised to about 500 V. If the fuel injection amount is large, for example, 60 mm$^3$/st, the terminal voltage of the piezo-actuator 31 rises to about 800 V. The fuel injection valve 1 maintains this condition until a subsequent injection.

At an injection timing of, for example, when the piston reaches a crank angle of 10° before TDC, the accumulated charge in the piezo-actuator 31 is shifted into the capacitor 605 by rendering the thyristor 604 conductive, and the voltage of the piezo-actuator 31 drops. Namely, the voltage of the piezo-actuator 31 drops according to the amount of charge shifted. The charge in the piezo-actuator 31 is released according to the voltage drop. Since the volume of the piezo-actuator 31 is reduced according to the amount of charge released, the piston 32 is pushed up under the action of the belleville spring 33 so that the volume of the fuel pressure control chamber 34 is increased, resulting in a decrease of the pressure in the fuel pressure control chamber 34. Therefore, an abrupt and large pressure difference occurs between the fuel pressure control chamber 34 and the accumulator 40, and the needle valve 12 is opened for an amount of lift corresponding to that pressure difference. Thus, the fuel in the accumulator 40 is injected from the nozzle hole 13, and together with this fuel injection, the pressure in the accumulator 40 is decreased until the pressure difference between the control oil pressure chamber 34 and the accumulator 40 enters a certain range. Then, the needle valve 12 is closed and the fuel injection from the nozzle hole 13 is terminated.

Therefore, the lift amount for opening the needle valve 12 can be controlled by varying the contraction of the piezo-actuator 31 under the force of the belleville springs 40, 50a, and 51a appropriately provided. As mentioned above, the contraction of the piezo-actuator 31 can be determined by appropriately turning ON and OFF the transistor 606 to control the voltage across the capacitor 605.

Figure 8:
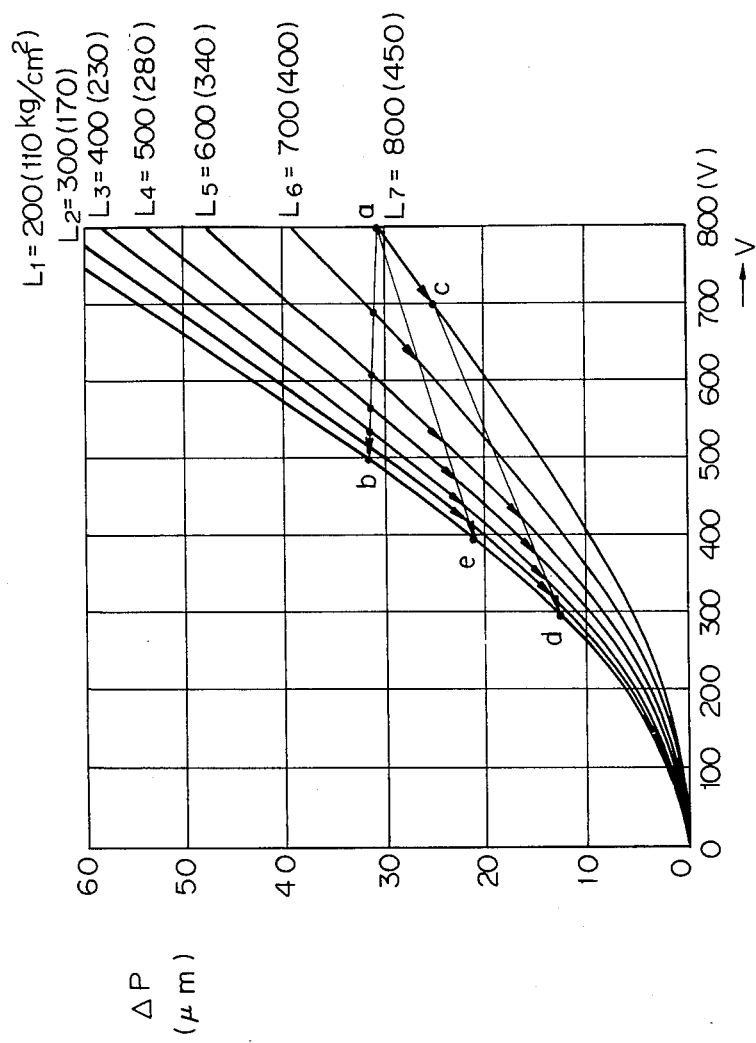
FIG. 8 is a characteristic diagram showing the displacement of the piezo-actuator of the fuel injector shown in FIG. 6.

The relationship between the voltage variation at the piezo-actuator 31 (V on the horizontal axis) and displacement ($\Delta P$ on the vertical axis) is shown in FIG. 8, taking as parameters the loads $L_1$ to $L_7$ (in kg). Note that the loads $L_1$ to $L_7$ are for the piezo-actuator 31 having an outside diameter of 15 mm and that an equivalent pressure (in kg/cm$^2$) is shown in parentheses. As apparent from FIG. 8, the higher the voltage variation, the larger the displacement of the piezo-actuator. Also, the larger the load (or pressure) applied to the piezo-actuator 31, the smaller the displacement $\Delta P$ of the piezo-actuator 31 due to compression by the load.

When the fuel injection is small, for example, 10 mm$^3$/st, the load applied to the piezo-actuator 32 is about 200 kg (about 110 kg/cm$^2$ in pressure) and the terminal voltage of the piezo-actuator 31 is about 500 V.

When, at this time, the piezo-actuator 31 is short-circuited at both ends, the displacement due to the contraction of the piezo-actuator 31 is as indicated by point b in FIG. 8, namely, about 32 μm. Similarly, when the fuel injection is large, for example, 60 mm$^3$/st, the load applied to the piezo-actuator 31 is 800 kg (about 450 kg/cm$^2$ in pressure) and the voltage is 800 V. Therefore, the displacement is about 31 μm, as shown at point a. In this control, the needle valve 12 is momentarily displaced to the same extent for the small fuel injection as for the large fuel injection. Since with the above remaining as it is, the lower the flow rate, the lower the injection pressure, the injection rate is low as compared with that at a high flow rate. However, the needle valve 12 will instantaneously gain the maximum lift, so that when the fuel supply is small, the injection rate is high but injection period is short, thus causing a louder noise.

The injection rate should be preferably variable according to the running speed of, and the load on, the engine; namely, the injection rate should be low at a low speed and load, and should be high at a high speed and load.

According to the present invention, the lift of the needle valve 12 is variable to permit the above variation of the injection rate. That is, the voltage across the capacitor 605 is controlled by the transistor 606 as described in the foregoing, so that when the fuel injection is at a maximum (60 mm$^3$/st), the contraction of the piezo-actuator 31 is also at a maximum, and the contraction of the piezo-actuator 31 is reduced when the fuel injection is smaller and as the weight applied to the piezo-actuator 31 decreases. When the engine speed is low, the release of the charge in the piezo-actuator 31 is controlled by the transistor 606 so that point c in FIG. 8 shifts to point d. Also when the engine speed is high, the release of charge is controlled by the transistor 606 in such a manner that point a shifts to point e in FIG. 8. Further, when the engine speed is in the middle range, the control is made so that a curve of the injection rate between c-d and a-e in FIG. 8 is established. These controls ensure an ideal injection rate and also widen the dynamic range of the fuel injection.

The above-mentioned voltage control by the transistor 606 can be conducted usually by determining appropriate engine conditions such as speed, lever opening, etc. for map control by a computer for adaptation to the above ideal injection rate and wide dynamic range of the fuel injection. In a more simple method, an analog control may be carried out to make the fuel injection proportional to at least the engine speed and lever opening.

As shown in FIG. 7, a resistor 605 is provided to release the charge accumulated in the capacitor 605 by a subsequent injection.

Figure 9:
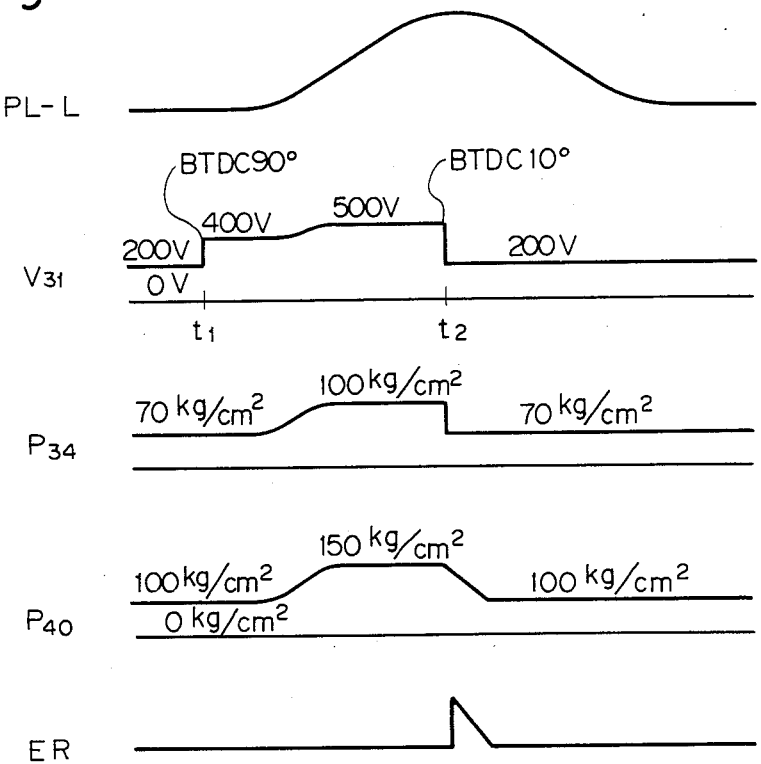
FIGS. 9 to 11 are characteristic diagrams showing the fuel injection control based on FIGS. 6 to 8.
Figure 10:
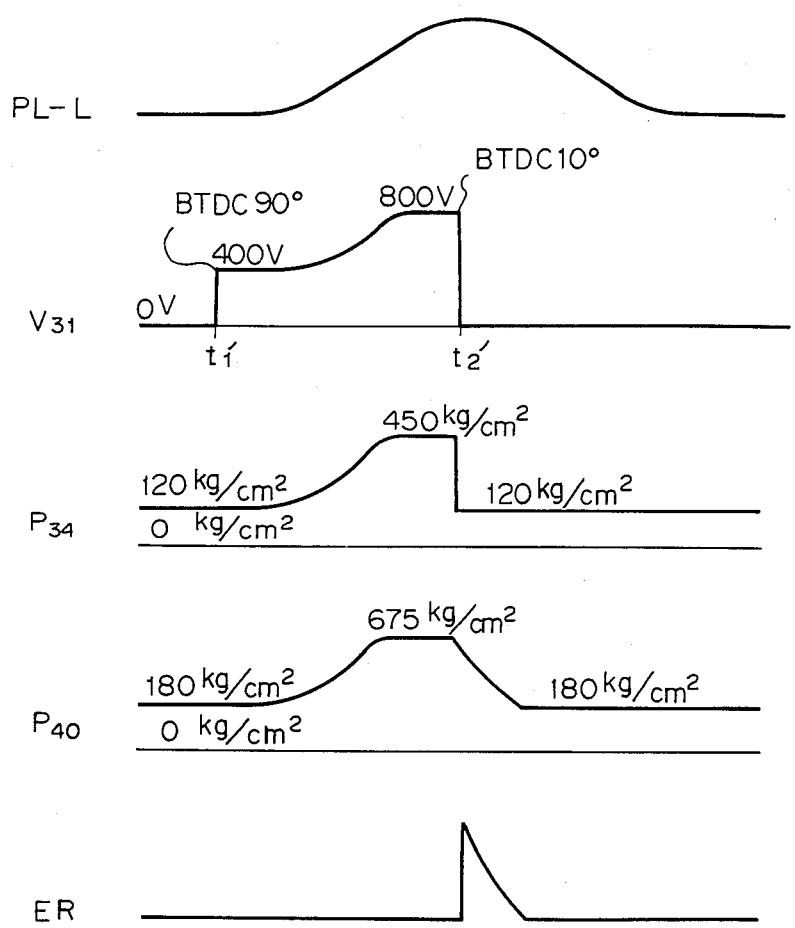

FIGS. 9 and 10 show, taking the horizontal axis as a time base, the plunger piston position PL-L, voltage $V_{31}$ of the piezo-actuator 31, pressure $P_{34}$ in the fuel pressure control chamber 34, pressure $P_{40}$ in the accumulator 40, and the injection rate ER. FIG. 9 shows the time chart where the fuel injection is small (10 mm$^3$/st) and FIG. 10 shows the time chart where the fuel injection is large (60 mm$^3$/st).

The fuel injection control where the fuel injection is small will be described first with reference to FIG. 9.

Before the time $t_1$, the transistor 606 in FIG. 7 is turned ON to make the terminal voltage $V_{31}$ of the piezo-actuator 31 300 V (see $V_{31}$ in FIG. 9). In this case, the pressure $P_{34}$ in the control oil pressure chamber 34 and that of $P_{40}$ in the accumulator 40 are 70 kg/cm$^2$ and 100 kg/cm$^2$, respectively. The difference between these pressures will not cause the needle valve 12 to work, so no injection is made from the nozzle hole 13 (see $P_{34}$, $P_{40}$ and ER in FIG. 9). Next, at a crank angle of 90° before TDC (BTDC), namely, at the time $t_1$, the thyristor 603 in FIG. 7 is rendered conductive to raise the terminal voltage of the piezo-actuator 31 to about 400 V (see $V_{31}$ in FIG. 9). Thereafter, the thyristor 603 is turned OFF. When the engine operation proceeds to the fuel feed under pressure, the pressure $P_{34}$ in the fuel pressure control chamber 34 and $P_{40}$ in the accumulator 40 rise from 70 kg/cm$^2$ to 100 kg/cm$^2$ and from 100 kg/cm$^2$ to 150 kg/cm$^2$, respectively (see $P_{34}$ and $P_{40}$ in FIG. 9). Thus, the piezo-actuator 31 receives a pressure with a larger difference ($P_{34}$-$P_{40}$) than the previous difference (70 kg/cm$^2$-100 kg/cm$^2$) and a charge is accumulated in the piezo-actuator 31 for the large difference, so that the terminal voltage rises to about 500 V (see $V_{31}$ in FIG. 9). The fuel feed under pressure is effected until a crank angle of 60° before the TDC is reached. Thereafter, this condition is maintained until a fuel injection is carried out. At the fuel injection timing, for example, at a crank angle of 10° before TDC (BTDC), that is, at the time $t_2$, the thyristor 604 in FIG. 7 is rendered conductive. Accordingly, the accumulated charge in the piezo-actuator 31 is shifted into the capacitor 605 and thus the terminal voltage $V_{31}$ of the piezo-actuator drops. The volume of the piezo-actuator 31 is reduced in volume according to the drop in the terminal voltage $V_{31}$ of the piezo-actuator 31. The terminal voltage $V_{31}$ of the piezo-actuator 31 is made the same as the value before the time $t_1$, namely, 200 V, through the transistor 606. Thus, the piston 31 is raised by the belleville spring 33 so that the volume of the fuel pressure control chamber 34 is increased and the pressure therein becomes in the order of 70 kg/cm$^2$ (see $V_{31}$ in FIG. 9). This pressure fall is rapidly attained according to the contraction of the piezo-actuator 31 and the increase in volume of the fuel pressure control chamber 34. On the other hand, since the pressure $P_{40}$ of the accumulator 40 is 150 kg/cm$^2$, the needle valve 12 is opened for an amount of lift corresponding to the pressure difference (150-70 kg/cm$^2$). Thus, the fuel in the accumulator 40 is injected from the nozzle hole 13 (see ER in FIG. 9). Because of this fuel injection, the pressure $P_{40}$ in the accumulator 40 falls to about 100 kg/cm$^2$ (see $P_{40}$ in FIG. 9).

Next, the fuel injection control where the fuel injection is large will be described with reference to FIG. 10.

Concerning $V_{31}$ in FIG. 10, the times $t_1'$ and $t_2'$ correspond, respectively, to the time $t_1$ in FIG. 9, at which the thyristor 603 is rendered conductive to raise the terminal voltage $V_{31}$ of the piezo-actuator 31, and the time $t_2$ at which the thyristor 604 is rendered conductive to lower the the terminal voltage of the piezo-actuator 31.

Before the time $t_1'$, the terminal voltage $V_{31}$ of the piezo-actuator 31 is made 0 V (see $V_{31}$ in FIG. 10). In this case, the pressure $P_{34}$ in the fuel pressure control chamber 34 and the pressure $P_{40}$ in the accumulator 40 are 120 kg/cm$^2$ and 180 kg/cm$^2$, respectively (see $P_{34}$ and $P_{40}$ in FIG. 10). The needle valve 12 is not operated by such a pressure difference. When the piston reaches a crank angle of 90° before TDC, namely, at the time $t_1'$, the thyristor 603 is rendered conductive to raise the terminal voltage of the piezo-actuator 31 to about 400 V as in the case of $V_{31}$ in FIG. 9. Thereafter, the thyristor 603 is turned OFF. When the engine proceeds to the fuel feed under pressure, the pressures $P_{34}$ and $P_{40}$ are raised from 120 kg/cm² to 450 kg/cm² and from 180 kg/cm² to 675 kg/cm², respectively, as described with reference to FIG. 9. Such pressure rises cause the terminal voltage of the piezo-actuator 31 to rise to about 800 V. At the injection timing, namely, at the time $t_2'$, the thyristor 604 is rendered conductive and the transistor 606 is turned ON, so that the terminal voltage $V_{31}$ of the piezo-actuator 31 becomes zero. Thus, the pressure $P_{34}$ in the fuel pressure control chamber 34 falls rapidly to the pressure of 120 kg/cm² before the time $t_1'$. Because of this fall of the pressure $P_{34}$, the difference (675 kg/cm²−120 kg/cm²) between the pressure $P_{34}$ of the fuel pressure control chamber 34 and the pressure $P_{40}$ of the accumulator 40 is large as compared with that in FIG. 9 showing the fuel injection control where the fuel injection is small. Accordingly, the amount of lift by the needle valve 12 is also large as compared with that shown in FIG. 9, resulting in a larger fuel injection from the nozzle hole 13 so that the injection rate ER (see ER in FIG. 10) is large as compared with the ER in FIG. 9.

In this way, the injection rate can be controlled according to the fuel injection amount. Thus, the fuel injection system shown in FIG. 6 has a larger dynamic range, permitting an improvement in fuel costs and emission and in noise suppression.

Figure 11:
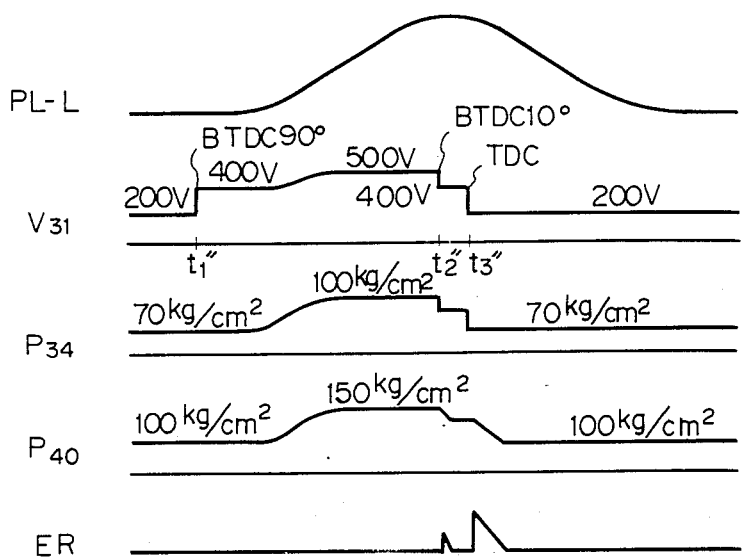

FIG. 11 shows the characteristics when a pilot injection is carried out, such as the plunger position PL-L, voltage $V_{31}$ of the piezo-actuator 31, pressure $P_{34}$ of the accumulator 40, and injection rate ER. Similar to the case shown in FIG. 9, at a crank angle of 90° before TDC, namely, at the time $t_1'$, the thyristor 103 is rendered conductive to raise the voltage of the piezo-actuator 31 to about 400 V, to expand the piezo-actuator 31. Also at a crank angle of 10° before TDC, the thyristor 604 is rendered conductive to control the terminal voltage of the piezo-actuator 31 to 400 V. When the engine proceeds to the fuel feed under pressure, the pressures $P_{34}$ and $P_{40}$ are raised from 70 to 100 kg/cm² and from 100 to 150 kg/cm², respectively, so that the terminal voltage $V_{31}$ of the piezo-actuator 31 rises to about 500 V. The thyristor 104 and transistor 606 are turned ON, so that the terminal voltage $V_{31}$ of the piezo-actuator 31 becomes about 400 V at a crank angle of 10° before TDC, namely, at the time $t_2''$. Then, at TDC, namely, at the time $t_3$, the terminal voltage $V_{31}$ of the piezo-actuator 31 is lowered stepwise to about 200 V, whereby a pilot injection can be carried out as indicated at ER in FIG. 11.

Under the above control, it is possible to effect a pilot injection having a low injection rate, and a main injection. Thus, noise during idling can be minimized.

Figure 12:
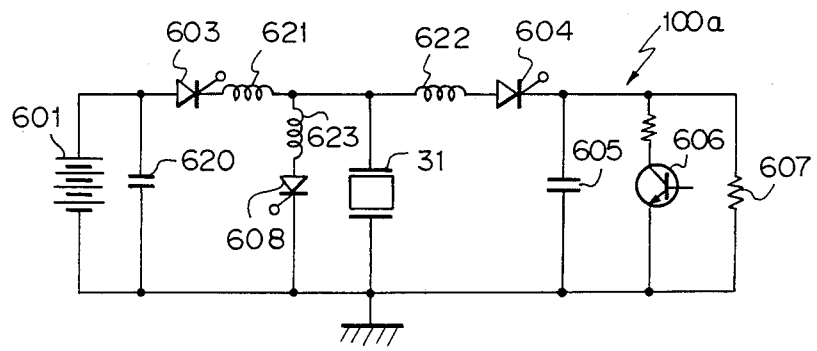
FIG. 12 illustrates a first variation of the electric circuit shown in FIG. 7.

Another embodiment of the electric circuit is shown in FIG. 12, and is similar to the embodiment shown in FIG. 7, but provided with a series circuit of a thyristor 608 and a coil 623 in parallel with the piezo-actuator 31.

Figure 13:
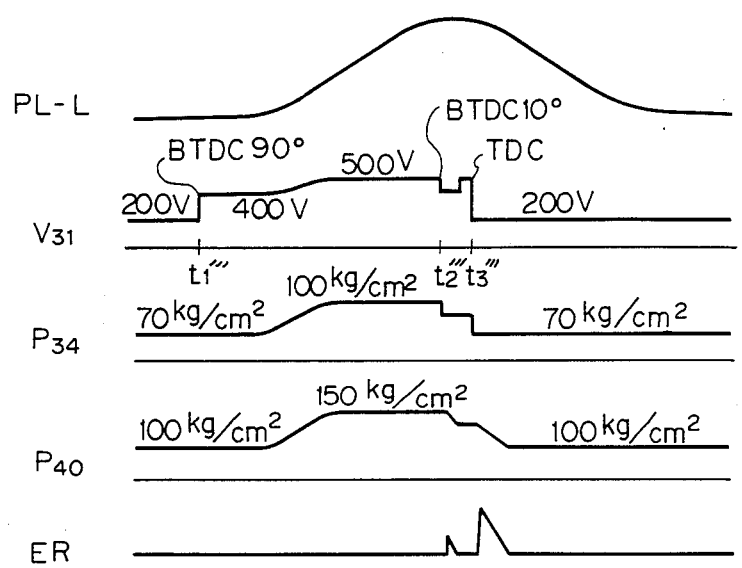
FIG. 13 is a characteristic diagram showing the fuel injection control by the electric circuit shown in FIG. 12.

The pilot injection to be effected using the electric circuit 100a shown in FIG. 12 is shown in FIG. 13. The PL-L to ER in FIG. 13 correspond to those in FIG. 11. At a crank angle of 10° before TDC, namely, at the time $t_2'''$, the thyristor 604 is rendered conductive and a part of the charge in the piezo-actuator 31 is released through the transistor 606 to effect a pilot injection. Then the thyristor 603 is rendered conductive to charge the piezo-actuator 31 and cause the terminal voltage $V_{31}$ thereof to rise to about 500 V again. Thereafter, the thyristor 608 is rendered conductive to release all the charge remaining in the piezo-actuator 31, to effect a main injection.

Figure 14:
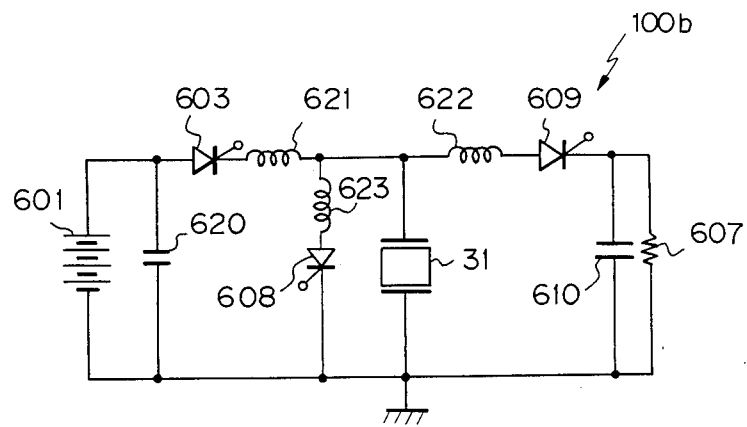
FIGS. 14 and 15, respectively, show other variations of the electric circuit shown in FIG. 17.

Yet another embodiment of the electric circuit is shown in FIG. 14.

The transistor 606 in FIG. 7 is eliminated from the electric circuit 100b shown in FIG. 14. The charge of the piezo-actuator 31 is released through a thyristor 609 to a capacitor 610 having a fixed capacity. After a minute fuel injection is carried out with the needle valve 12 slightly lifted, the remaining charge in the piezo-actuator 31 is released through the thyristor 608, permitting an initial fuel injection at a low rate.

This may be carried out over the whole range of engine running conditions and to reduce noise at the time of engine idling.

Figure 15:
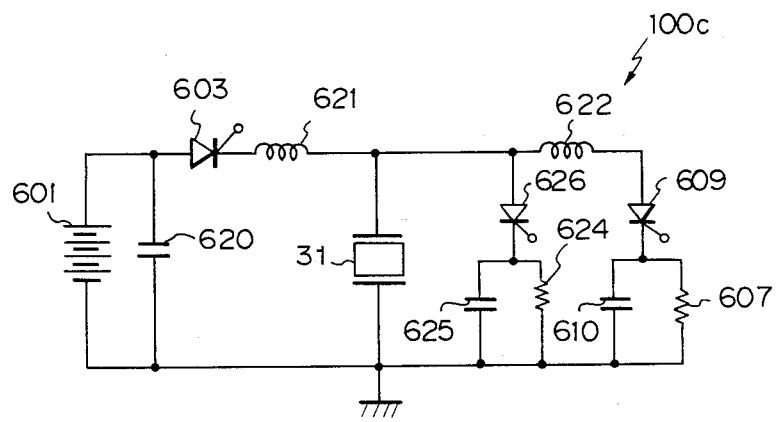

FIG. 15 shows an electric circuit 100c permitting the initial injection rate and injection amount of each of the cylinders to be corrected when the accumulator nozzle 1 according to the present invention is used with a multi-cylinder engine.

The electric circuit 100c shown in FIG. 15 has, in place of the series circuit of the coil 623 and thyristor 608 shown in FIG. 14, a parallel circuit consisting of a resistor 620 and capacitor 625, and a thyristor 626 in series with the parallel circuit, connected in parallel with the piezo-actuator 31. The resistors 603 and 624 are provided for releasing the accumulated charge in the piezo-actuator 31 according to predetermined time constants.

The first charge releasing circuitry including the thyristor 626, capacitor 625, and resistor 624 operates for an injection in which the initial injection rate is set very low.

The second charge releasing circuitry including the coil 622, thyristor 609, capacitor 610, and resistor 607 is similar to that shown in FIG. 14. This circuitry also can effect a minute fuel injection with the needle valve 12 lifted slightly.

Note, by adjusting the capacity of each of the capacitors 610 and 625 for each cylinder, the injection rate and amount can be adjusted for each cylinder.

Further, the series circuit of the thyristor 608 and coil 623 shown in FIG. 14 may be provided in parallel with the piezo-actuator 31 in the circuit shown in FIG. 15. Thus, a main injection can be made after two pilot injections are carried out.

As described above, with the embodiments of the accumulator nozzle 1 shown in FIGS. 6 to 15, it is possible to enlarge the dynamic range of the injection rate by arbitrarily controlling the amount of charge released from the piezo-actuator 31 and also the amount of lift of the needle valve 12.

Such an enlarged dynamic range permits an improvement to the fuel cost of internal combustion engines, the control of exhaust gas discharge, and the reduction of engine noise.

Figure 16:
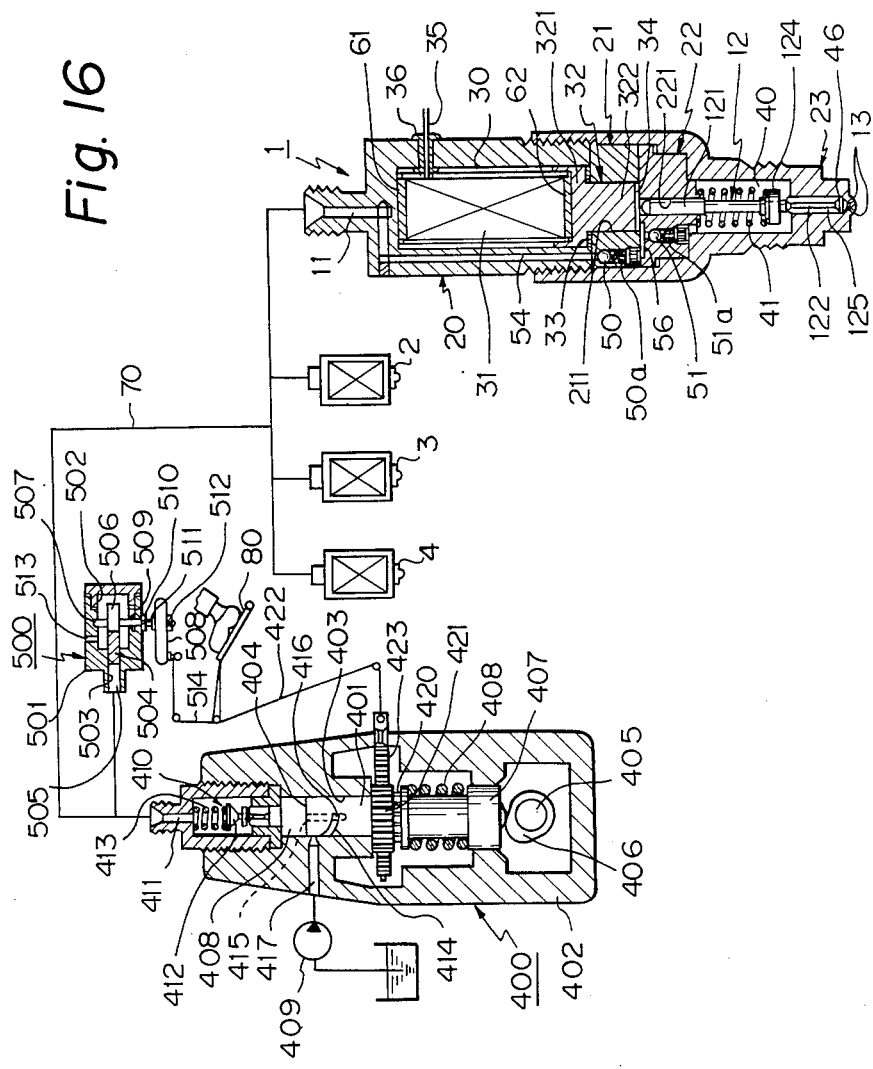
FIG. 16 is a sectional view of one embodiment of the fuel injection system according to the present invention.

FIG. 16 shows one embodiment of the fuel injection system according to the present invention. In the Figure, fuel injectors 1, 2, 3, and 4 are provided for injection of the fuel into the combustion chamber of an engine, with one injector provided for each of the engine cylinders, namely, for a four-cylinder engine, for example, four fuel injectors are provided. These fuel injectors 1, 2, 3, and 4 are supplied under pressure with fuel from a fuel injection pump 400 which has only a single-plunger type measuring mechanism without a timer mechanism, a fuel distribution mechanism, and a number of plungers equal to the number of cylinders, which are conventionally provided. In this embodiment, the fuel injection pump 400 is a so-called in-line pump. The fuel fed under pressure from the injection pump 400 flows from an inlet port 11 into the accumulator 40 in the fuel injector 1, and is injected from a nozzle hole 13 as a needle valve 12 opens and closes. The timing of the fuel feed by the injection pump is not at the TDC of each cylinder, as in the conventional fuel injection system, but has already been completed earlier at a TDC of, for example, a crank angle of 60° before TDC. The amount of fuel fed one by the injection pump is controlled according to the lever opening angle of the injection pump as well known.

A fuel pipe-line 70 connecting the fuel injection pump 400 to each of the fuel injectors 1, 2, 3, and 4 is connected at the one end to the discharge port of the fuel injection pump 400, divided at a half-way point into a number of branches corresponding to the number of cylinders, and the ends of the branched pipe-lines are connected to the inlet ports 11 of fuel injectors 1, 2, 3, and 4, respectively. Provided nearer the injection pump 400 than the branched point of the fuel pipe-line 70 is a volume changing unit 500 as a means of controlling (increase/decrease) the fuel pressure in the fuel pipe-line 70. The operation of the volume changing unit 500 is interlocked with the operation of an acceleration pedal 80 to change the fuel pressure in the fuel pipe-line 70; namely, to raise the fuel pressure when the acceleration pedal opening is large and to lower the pressure when the opening is small.

The construction of the fuel injector 1 is similar to that of the fuel injector shown in FIG. 6, provided that the needle valve 12 is composed of a single member.

The fuel injection pump 400 is constructed as described below. The injection pump 400 has a plunger 401, but does not have a distribution mechanism to distribute the fuel to each of the fuel injectors 1, 2, 3, and 4, or a timer mechanism to control the injection timing. The plunger 401 is slidably accommodated in a cylinder bore 403 formed in a casing 402, and is so arranged that it is reciprocally movable at a rate that is a half that of an engine speed; however, the plunger may be so arranged that the reciprocal movement can be carried out at a rate that is in a ratio of 1/1, 2/1 or the like, in addition to a half (½) that of the engine speed, depending on the pumping capacity. For example, where the reciprocal movement is to be effected synchronously with a half engine speed, the driving force is transmitted from the crank shaft of the engine to a drive 405 shaft through gears or a timing belt and the plunger 401 is reciprocally moved vertically from the half engine speed by means of a face cam provided on the drive shaft 405. That is, a tappet 407 formed at the bottom end of the plunger 401 abuts against the face cam 406 and is always forced downward (as in the plane of the Figure) by a spring 408, and the plunger 401 reciprocally moves along the shape of the face cam 406 as the drive shaft 405 rotates.

A pressure chamber 408 defined by a top end face 404 of the plunger 401 and the cylinder bore 403 is expanded and contracted as the plunger 401 moves reciprocally. When the pressure chamber 408 is expanded, the fuel fed under pressure through the casing 402 is drawn into the pressure chamber 408 through an inlet port 417 formed in the casing 402, and when the pressure chamber 408 is contracted, the fuel in the pressure chamber 408 forces a delivery valve 410 to open and the fuel is discharged into the fuel pipe-line 70 through a discharge port 411. The delivery valve 410 has a valve body 412 for closing the pressure chamber 408 and a spring 413 for forcing the valve body 412 toward the pressure chamber 408. The valve body 412 opens according to the pressure level in the pressure chamber 408, to pass the fuel to the fuel pipe-line 70. When the pressure in the pressure chamber 408 becomes low, the valve body 412 is displaced toward the pressure chamber 408 under the action of the spring 413, and the pressure in the fuel pipe-line 70 is decreased. Namely, the delivery valve 410 operates as both a check valve and a retraction valve.

The plunger 401 has a spiral path 414 formed in the surface thereof, and an axial path 514 formed therein which communicates with the pressure chamber 408 and a radial path 416 which provides communication between these paths 414 and 415. When the plunger 401 moves downward (as in the Figure), the top end face 404 of the plunger 401 moves away from the inlet port 122 and the pressure chamber 408 communicates with the inlet port 122, so that fuel is fed into the pressure chamber 408 through the feed pump 409. After the plunger 401 reaches bottom dead center and then starts moving upward, it closes the inlet port 417 to pressurize the fuel in the pressure chamber 408. The pressurized fuel forces the delivery valve 410 to open, and is discharged into the fuel pipe-line 70. As the plunger 401 continues rising, the spiral path 414 communicates with the inlet port 417 so that fuel in the pressure chamber 408 flows back into the feed pump 409 through the inlet port 417. Thus, the fuel feed under pressure is completed. At this time, the fuel pressure in the fuel pipe-line 70 is reduced by the retracting action of the delivery valve 410.

The fuel discharge amount of the fuel injection pump 400 is adjusted by rotating the plunger to change the position of the plunger 401 at which the spiral path 414 communicates with the inlet port 417. For example, in the condition in FIG. 16, communication is first established between the inlet port 417 and the spiral path 414; therefore, the discharge amount of fuel is small. On the contrary, when the plunger 401 is rotated clockwise as viewed from above, the communication between the inlet portion 417 and path 414 is delayed, so that the discharge amount of fuel is large. To accomplish this rotation of the plunger 401, a spline 420 is provided having many recesses formed vertically therein. The spline 420 has a pinion 421 slidably fitted therein. The pinion 421 engages with a rack 423 which is interlocked with the operation of the acceleration pedal 80 by means of a link 422 and rotates according to the opening of the acceleration pedal. Namely, when the acceleration pedal opening is small, the rack 423 is positioned at the left in the Figure to limit the fuel discharge amount, and when the acceleration pedal opening is large, the rack 423 moves rightward to increase the fuel discharge amount.

The construction of the volume changing unit 500 will be described below. The volume changing unit 500 is provide with a casing 501 in which a large diameter bore 502 and small diameter bore 503 are formed. The small diameter bore 503 has a piston 504 slidably accommodated therein and defining a pressure chamber 505. The pressure chamber 505 communicates with the fuel pipe-line 70, and expands and contracts as the piston 504 advances and retracts, whereby the fuel pressure in the fuel pipe-line 70 is changed. Note that the piston 405 has a diameter of 4 mm and stroke of 10 mm. The fuel spill from the pressure chamber 505 into the large diameter bore 502 is returned into the fuel tank through a hole 513 formed in the casing 501.

The base of the piston 504 protrudes inside the large diameter bore 502 and engages a face cam 506. The face cam 506 is force-fitted in a rotation shaft 507 having one end thereof supported in a concave portion formed in the inner wall of the casing 501, and the other end penetrating the casing 501. The projecting end has a lever 508 fixed thereon. The lever 508 is coupled to the acceleration pedal 80 by means of a link 514. The lever 508 is held between a flange portion 511 and nut 512 to prevent vertical movement of the lever 508. An O-ring 509 is provided between the rotation shaft 507 and casing 501, to prevent fuel leakage. The portion of the rotation shaft 507, which projects from the casing 501, has a circlip 510 provided thereon to prevent vertical movement by the rotation shaft 507.

Figure 17:
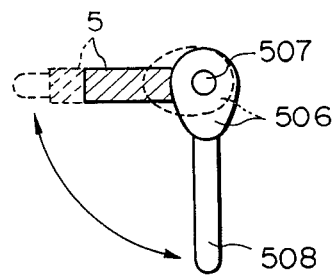
FIG. 17 is a plan view showing the positional relationship between the cam and piston shown in FIG. 16.

FIG. 17 shows the positional relationship between the face cam 506 and lever 508. As apparent from this Figure, the lever 508 is provided in the same direction as the longer diameter of the face cam 506. When the acceleration pedal opening is small, the piston 504 abuts against the short diameter portion of the face cam 506, as indicated with a solid line, namely, the piston 504 is moved rightward in the Figure by the pressure in the pressure chamber 505. When the acceleration pedal opening is large, the piston 504 is moved leftward as indicated with a dash line to reduce the volume of the pressure chamber 505. Note that since the pressure in the pressure chamber 505 acts on the end face of the piston 504, the piston 504 is always forced against the face cam 506, and thus a spring or the like is not required. Also, since the lever 508 is several times longer than the diameter of the face cam 506, the necessary force applied to the acceleration pedal 80 can be reduced in accordance with the ratio between the lever length and the face cam diameter.

This embodiment acts as follows the fuel injection.

When a crank angle of 90° before the compression TDC is reached at a cylinder of the engine, the fuel injection pump starts feeding the fuel under pressure to the accumulator nozzles 1, 2, 3, and 4 simultaneously. The fuel under pressure is led to the accumulator nozzles 1, 2, 3, and 4 via the fuel pipe-line 70. In the accumulator nozzle 1, the fuel from the fuel pipe-line 70 flows through the path 54, check valve 50, radial recess 56, and check valve 51 into the accumulator 40. Also at this time, the fuel passing through the check valve 50 and radial recess 56 flows into the fuel pressure control chamber 34.

Concerning the fuel pressure acting on the needle valve 12, the area receiving the pressure component downward is equal to the sectional area of the pressure receiving bar 121 of the needle valve 12, and the area receiving the pressure component acting upward is the sectional area of the pressure receiving bar 121 minus a portion of the bottom end of the valve body 122 which is in close contact with the seat surface 46. Therefore, the component of the fuel pressure acting downward on the needle valve 12 is greater than the upward acting component. Also, the resilience of the spring 41 acts downward upon the needle valve 212. Thus the needle valve 12 is maintained as seated, closing the nozzle hole 13, so that the compressed fuel fed into the accumulator nozzle 1 flows into the accumulator 40 and fuel pressure control chamber 34 and is stored there under pressure. The fuel feed from the fuel injection pump 400 ends at a crank angle of 60° before TDC, so that the check valves 50 and 51 are closed, whereby the accumulator 40 and fuel pressure control chamber 34 are isolated from each other. The delivery valve 410 of the fuel injection pump 400 then retracts, so the pressure in the fuel pipe-line 70 is lower than that in the accumulator 40 and fuel pressure control chamber 34.

When the piezo-actuator 31 is contracted at a selected time, for example, at the TDC, the volume of the fuel pressure control chamber 34 is increased. The needle valve 12 is displaced upward according to the volume increase, the nozzle hole 13 is opened, and the fuel in the accumulator 40 is injected into the combustion chamber of the engine. The fuel pressure in the accumulator falls due to the fuel injection, and the needle valve 12 drops correspondingly. Finally, the needle valve 12 is seated on the seat surface 56, thus closing the nozzle hole 12 to end the fuel injection.

Figure 18A:
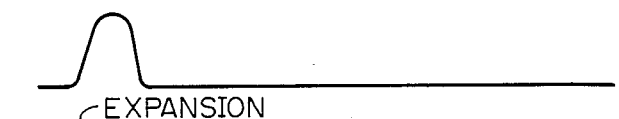
Figure 18B:
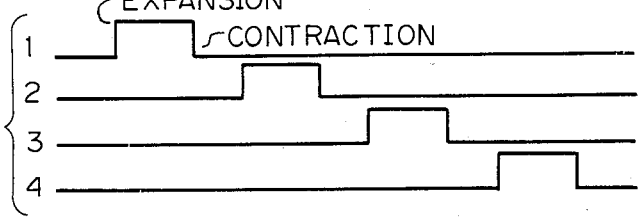
Figure 18C:
Figure 18D:
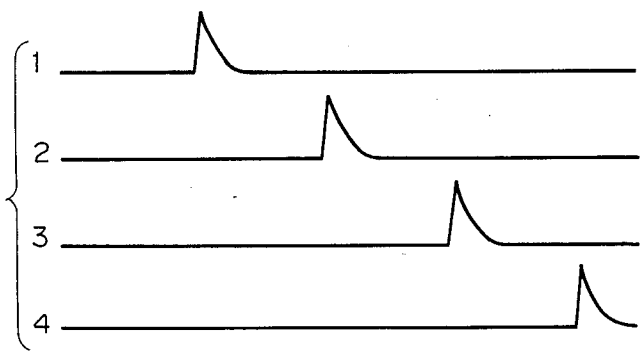
Figure 19A:
Figure 19B:
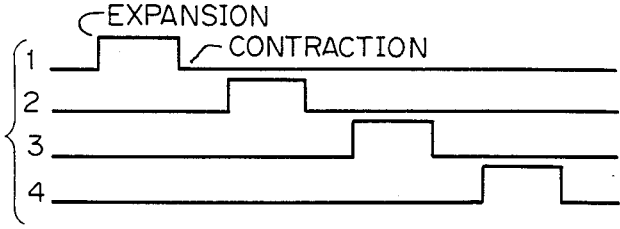
Figure 19C:
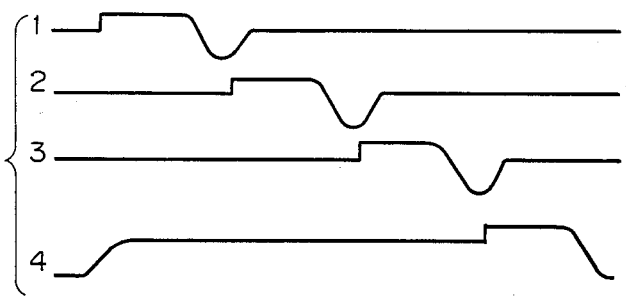
Figure 19D:
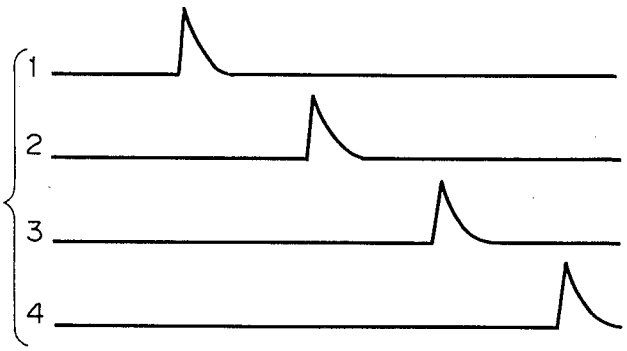

The other accumulator nozzles 2, 3, and 4 also effect the above-mentioned operation sequentially, and fuel injection is carried out in each of the cylinders. Thus one revolution of the engine is complete. FIGS. 18a, 18b, 18c, and 18d show the fuel injection operation at each of the cylinders. FIG. 18 shows the pressure in the fuel pipe-line 70, FIG. 18b shows the drive signal for the piezo-actuator, FIG. 18c shows the pressure in the fuel injector, and FIG. 18d shows the change of injection rate. In these Figures, the numerals are the same as the reference numerals used for the fuel injectors in the other figures. Under the action of the fuel injection pump 400, the pressure in the fuel pipeline 70 rises (as in FIG. 18a), whereby the pressure in the fuel injectors 1, 2, 3, and 4 also rises (as in FIG. 18c). The drive signal for the piezo-actuator 31 is delivered for the fuel injectors 1, 2, 3, and 4 in this order (as in FIG. 18b), whereby the piezo-actuator 31 at each of the fuel injectors 1, 2, 3 and 4 is contracted after being expanded. The pressure in the fuel injectors 1, 2, 3, and 4 rises as the piezo-actuator 31 expands, and the pressure then falls abruptly due to the contraction of the piezo-actuator 31 (as in FIG. 18c). At this contraction, a fuel injection is effected (as in FIG. 18d). Thereafter, the fuel is discharged from the fuel injection pump 400 again, the pressure in the fuel pipe-line 70 rises, and the above operations are repeated.

If the fuel supply from the fuel injection pump 400 is small, namely, if the fuel injection amount is small, the pressure in both the fuel pressure control chamber 34 and the accumulator 40 is low, so that the fuel pressure at both the start and end of the fuel injection is low. Therefore, after the end of the fuel injection, the fuel pressure control chamber 34 and accumulator 40 will await a fuel supply from the fuel injection pump 400 while the pressure therein is low as compared with that where the fuel injection amount is large. Thus, since the pressure in the fuel pressure control chamber 34 and accumulator 40 after the fuel injection varies depending upon the amount of fuel injected, the response to the change of injection pressure is delayed at the time of acceleration or deceleration when the amount of fuel supplied from the fuel injection pump 400 changes, unless countermeasures are taken. To prevent this response delay, a volume changing unit 500 is provided according to the present invention.

When the acceleration pedal 80 is depressed, for example, in order to increase the fuel injection amount, the volume of the pressure chamber 505 is decreased and the inside of the fuel pipe-line 70 is pressurized so that the fuel pressure therein rises rapidly. The fuel pressure will rise about 100 atms when the volume of that fuel system is contracted by 1%. Since the pressure in the fuel injection pipe-line 70 is 2000 mm³ in this embodiment, when the piston 504 of the volume changing unit 500 is displaced by 5 mm, a pressure rise of about 300 kgf/cm³ results. On the contrary, when the opening of the acceleration pedal 80 is decreased for deceleration, the piston 504 is forced back by the fuel pressure, so that the pressure in the fuel pipe-line 70 is decreased. While the engine is running normally, the piston 504 is at a fixed position, and the pressure in the fuel pipe-line 70 does not change. At the time of acceleration or deceleration, the piston 504 is displaced so that a required injection pressure, namely, a required fuel injection, is rapidly obtained.

As described in the foregoing, in the embodiment a volume changing unit 500 is provided in the fuel pipe-line 70 between the fuel injection pump 400 and each of the fuel injectors 1, 2, 3, and 4. This volume changing unit 500 is interlocked with the movement of the acceleration pedal 80; when the opening of the acceleration pedal 80 is small, the volume of the pressure chamber 505 is made large, and is made small when the opening of the acceleration pedal 80 is large. Also, the fuel injector accumulates under pressure in the accumulator 40 therein of the fuel fed under pressure, and the fuel can be injected from the nozzle hole 13 into the combustion chamber of the engine by operating the piezo-actuator 31 when necessary.

Therefore, this embodiment is advantageous in the following points:

1. The timer mechanism and the number of plungers corresponding to the number of engine cylinders, which are required in the conventional in-line pump, are unnecessary, and a fuel injection pump 400 having very simple construction and having only a volume control mechanism may be used instead.
2. By using the volume changing unit 500, fuel injection can be carried out with a very good follow-up at any accelerating or decelerating operation.
3. The volume changing unit 500 permits, when the load to the engine is low, an increase in the volume and a lowering of the pressure in the fuel pipe-line 70, thereby decreasing the injection pressure of the fuel injection valves 1, 2, 3, and 4 and conversely, when the load on the engine is high, an increase in the injection pressure of the valves 1, 2, 3, and 4, which is very preferable in view of the engine performance.

Where the fuel injection pump 400 is driven at the same speed as the engine speed or at a speed double the engine speed, the fuel pressure can be more quickly changed in response to the increase or decrease of the fuel injection amount, whereby the response to accelerating or decelerating operations can be further improved.

In the embodiment shown in FIG. 16, a fuel injection pump 400, normally called an "in-line pump", is adopted, but a fuel injection pump such as a Bosche VE type pump may be used in place of the in-line pump and will have the same effect as in this embodiment. In the latter case, a mechanism for a fuel distribution to the cylinders is not required, and where the accumulator nozzle is used at each cylinder of, for example, a four-cylinder engine, the pump can be driven at a half engine speed. Also, a delivery valve is not necessary at each cylinder, only a single delivery valve need be provided in the pump pressure chamber, which eliminates the fuel distribution mechanism. Thus, the fuel injection pump can be of a very simple construction.

FIGS. 19a, 19b, 19c, and 19d show the fuel injection operations, respectively, of each cylinder in another embodiment of the present invention, in which a distribution pump is employed as the fuel injection pump 400. FIGS. 19a to 19d show graphs similar to those of FIGS. 18a to 18d. As apparent through comparison between these graphs in FIGS. 19a to 19d and 18a to 18d, the change in discharge pressure of the fuel injection pump 400 (as in FIG. 18a and 19a) and the change of the pressure in the accumulator nozzle (as in FIGS. 18v and 19c) are different in these embodiments. According to this embodiment, the plunger of the fuel injection pump 400 reciprocates 4 times per cycle of the engine, and the pressure in the fuel pipe-line 70 rises 4 times per cycle of the engine. The pressure in the fuel injectors 1, 2, 3, and 4 rises once as the piezo-actuator 31 of the fuel injector expands, and then falls as the piezo-actuator 31 contracts (as in FIG. 19a). On the other hand, the pressure fall causes the fuel to flow via the fuel pipe-line 70 into the fuel injector through which the fuel injection has been made, and the pressure in the fuel injector returns to a value before the actuator 31 expanded and contracted.

Figure 20:
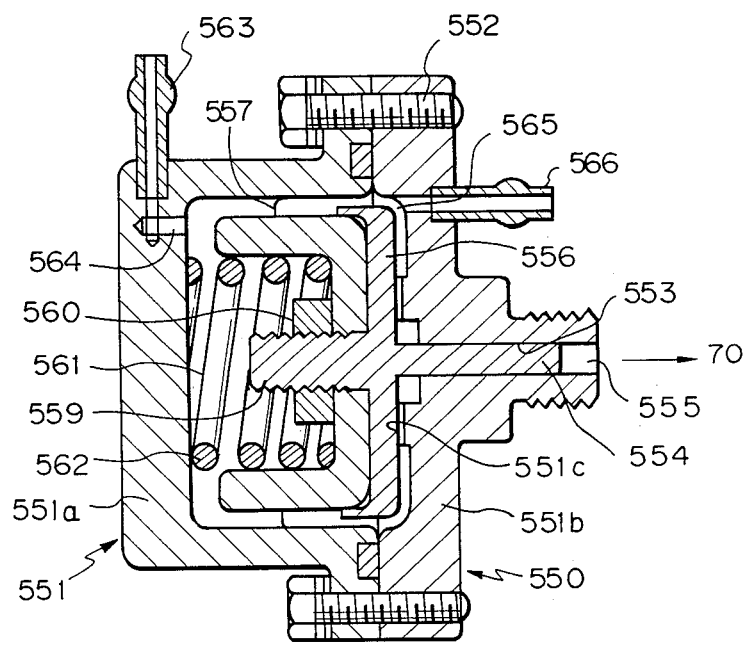
FIG. 20 is a sectional view showing another embodiment of the volume changing unit according to the present invention.

FIG. 20 shows another embodiment of the volume changing unit.

This volume changing unit 550 utilizes the negative pressure developed in the engine to change the fuel pressure in the fuel pipe-line 70; in a Diesel engine, it utilizes the negative pressure in the vacuum pump and where a suction throttle unit is provided, it utilizes the negative pressure in the manifold. For a gasoline engine, the negative pressure in the manifold is utilized to change the volume of the fuel pipe-line 70 depending upon the load on the engine.

The volume changing unit 550 has a casing 551 composed of a lid member 551b fixed to cylindrical bottomed member 551a by means of bolts 552. Formed within the lid member 551b is a bore 553 defining a pressure chamber 555 in which a piston 554 is slidably accommodated. The pressure chamber 555 communicates with the fuel pipe-line 70. Formed at the opposite side of the piston to the pressure chamber 555 is a disk 556 which is accommodated in the casing 551. A diaphragm 557 is fixed by the outer circumferential edge thereof between the bottomed cylindrical member 551a and the lid member 551b, and by the inner circumferential edge thereof between the disk 556 and a retainer 558. The retainer 558 is fixed to the disk 556 by tightening a nut 560 on a threaded portion 5559 projecting from the disk 556. Thus, a variable pressure chamber 561 is formed at the side of the cylindrical bottomed member 551a in the casing 551, and an atmospheric pressure chamber 565 is formed at the side of the lid member 551b. A spring 562 is provided in the variable pressure chamber 561, which spring forces the piston 554 toward the pressure chamber 555 by the retainer 558.

A pipe 563 provided on the cylindrical bottomed member 551a is connected to a negative pressure source (not shown; but, for example, a vacuum pump) and communicates with the variable pressure chamber 561 by means of a path 564. On the other hand, a drain pipe 566 provided in the lid member 551b is opened to the atmosphere, and communicates with the atmospheric pressure chamber 565. Thus, the piston 554 is displaced in accordance with the negative pressure led into the variable pressure chamber 561, to change the volume of the pressure chamber 555. Note that forward movement of the piston 554 is limited by an inner wall 551c of the lid member 551b.

Thus, the piston 554 is forced leftward by the pressure in the pressure chamber 555, which acts on the end face of the piston 554, and by the negative pressure in the variable pressure chamber 561 which acts on the diaphragm 557. That is, the piston 554 is positioned in accordance with the balance between these pressures. Since the negative pressure is large when the load on the engine is low, the piston 554 is displaced leftward as in the plane of FIG. 20, so that the volume of the pressure chamber 555 is increased. Conversely, since the negative pressure is small when the engine load is high, the piston 554 is moved rightward as in the plane of FIG. 20 under the force of the spring 562, resulting in a decrease in the volume of the pressure chamber 555. Namely, the volume changing unit 550 in this embodiment has the same effect as the volume changing unit 550 in the first embodiment; i.e., when the load on the engine is high, fuel injection is carried out under a high pressure, and when the load on the engine is low, the injection is effected under a low pressure, whereby the engine performance can be improved. Also the response at the time of acceleration and deceleration can be improved.

We claim:

1. A fuel injector comprising;
   a housing having formed therein a fuel pressure control chamber and an accumulator, which temporarily retain fuel, a path leading into the fuel pressure control chamber and accumulator, so that they receive which is intermittently fed under pressure from a fuel source through said path, and formed with a nozzle hole through which fuel in said accumulator is injected;
   a piezo actuator accommodated in said housing, defining said fuel pressure control chamber and expanding and contracting in accordance with a voltage applied thereto to change the volume of said fuel pressure control chamber;
   needle valve, of a type which opens and closes a responsive to an applied pressure, provided reciprocally movably within said housing between said accumulator and said nozzle hole and which, responsive to a pressure from said fuel pressure control chamber and accumulator, opens and closes communication between said accumulator and said nozzle hole;
   check valve means for normally closing communication between said path and said fuel pressure control chamber and between said path and said accumulator and for opening said communication according to pressure in said path and/or in said fuel pressure control chamber; and
   an electric circuit which controls a voltage applied to said piezo-actuator.
   the arrangement being such that fuel supplied from said fuel source passes through said path and is fed under pressure into said fuel pressure control chamber and accumulator via said check valve;
   said needle valve closing communication between said accumulator and said nozzle hole when said piezo actuator expands to increase fuel pressure within said fuel pressure control chamber, and opening communication between said accumulator and said nozzle hole when said piezo actuator contracts to decrease fuel pressure in said fuel pressure control chamber, thereby allowing fuel to be injected from said nozzle hole.

2. A fuel injector in accordance with claim 1, wherein said housing comprises:
   a cylindrical bottomed piezo-actuator holder which receives said piezo-actuator;
   an annular distance piece closely fixed at the opening of said piezo-actuator holder;
   a cylindrical nozzle holder provided at the opposite side of said distance piece relative to said piezo-actuator holder; and
   a nozzle body having said nozzle hole formed therein, provided at the opposite side of said nozzle holder relative to said distance piece and which accommodates said needle valve.

3. A fuel injector in accordance with claim 2, wherein said fuel pressure control chamber is formed in said piezo-actuator holder, said accumulator being formed in said nozzle holder, said distance piece having a communication hole formed at the middle thereof through which said fuel pressure control chamber and said accumulator can communicate with each other, and said path being provided through said piezo-actuator and said distance piece.

4. A fuel injector in accordance with claim 3, wherein said check valve is accommodated in said accumulator to permit opening and closing of said communication hole and path.

5. A fuel injector in accordance with claim 4, wherein a spring is provided between said check and needle valves, whereby said check valve is forced in the direction for closing said communication hole and path and said needle valve is forced in the direction for closing said nozzle hole.

6. A fuel injector in accordance with claim 3, wherein a piston and belleville spring are provided in said piezo-actuator holder, said piston and said distance piece together defining said fuel pressure control chamber, and said belleville spring serving to force said piston toward said piezo-actuator until said piston abuts against said piezo-actuator.

7. A fuel injector in accordance with claim 2, wherein said fuel pressure control chamber is defined within said distance piece, said accumulator being formed within said nozzle body, said path being formed within said piezo-actuator holder, distance piece and nozzle holder, and said fuel pressure control chamber and accumulator being permitted to communicate with each other through the path formed in said nozzle holder.

8. A fuel injector in accordance with claim 7, wherein said check valve is provided in each of said paths in said distance piece and in said nozzle holder.

9. A fuel injector in accordance with claim 7, wherein a spring is provided between said nozzle holder and needle valve, for forcing said needle valve in the direction for closing said nozzle hole.

10. A fuel injector valve in accordance with claim 7, wherein said piston has large and small diameter sections, with the large diameter section slidably accommodated within said piezo-actuator holder and the small diameter section slidably accommodated within said distance piece, a belleville spring being provided between said distance piece and the large diameter section to force said piston toward said piezo-actuator until said piston abuts against said piezo-actuator.

11. A fuel injector in accordance with claim 1, wherein said piezo-actuator consists of a plurality of piezoelectric elements and conductors axially laminated as a stack.

12. A fuel injector in accordance with claim 11, wherein said piezoelectric elements are made of a sintered ferroelectric ceramic.

13. A fuel injector in accordance with claim 1, wherein said needle valve is divided into a bar section to receive the pressure from said fuel chamber control and a valve body to open and close said nozzle hole, said pressure receiving bar section and valve body being coupled by means of a pin so as to be radially displaceable in relation to each other.

14. A fuel injector in accordance with claim 1, wherein said electric circuit comprises a circuit section for applying a voltage to said piezo-actuator and a circuit for releasing a charge accumulated in said piezo-actuator, said electric circuit serving to control the voltage applied to said piezo-actuator or the released amount of the charge accumulated in said piezo-actuator in order to control the pressure in said fuel pressure control chamber, whereby the lift amount of said needle valve is controlled so that the amount of fuel discharged from said nozzle hole is controlled.

15. A fuel injector in accordance with claim 14, wherein the voltage applying circuit section of said electric circuit comprises a DC power source, a switching element which provides connection/disconnection between said DC source and piezo-actuator, and an LC circuit so arranged that said DC source applies a voltage to said piezo-actuator according to the LC resonance characteristic.

16. A fuel injector in accordance with claim 14 or claim 15, wherein the accumulated charge releasing circuit section of said electric circuit comprises a capacitor, a resistor and a first switching element all connected in parallel with said piezo-actuator, and a second switching element connected between said parallel circuit elements and said piezo-actuator, the amount of charge accumulated in said piezo-accumulator being adjusted according to the characteristics determined under the control of said first switching element and depending on the capacitance of said capacitor and resistance of said resistor while the second switching element is in operation.

17. A fuel injector in accordance with claim 14 or claim 15, wherein the accumulated charge releasing circuit section of said electric circuit comprises a first accumulated charge releasing circuit which consists of a capacitor, a resistor and a first switching element all connected in parallel with said piezo-actuator, and a second switching element connected between said parallel circuit elements and said piezo-actuator, and a second accumulated charge releasing circuit connected in parallel with said first accumulated charge releasing circuit and said piezo-actuator and which has a third switching element, a first release of accumulated charge from said piezo-actuator being controlled according to the characteristic determined under the control of said first switching element and depending on the capacitance of said capacitor and resistance of said resistor, when the second switching element of said first accumulated charge releasing circuit is in operation while a second release of accumulated charge from said piezo-actuator is controlled under the control of the third switching element of said second accumulated charge releasing circuit.

18. A fuel injector in accordance with claim 14 or claim 15, wherein the accumulated charge releasing circuit section of said electric circuit comprises a first accumulated charge releasing circuit which consists of a capacitor and resistor connected in parallel with said piezo-actuator, and a first switching element connected between said parallel circuit elements and said piezo-actuator, and a second accumulated charge releasing circuit connected in parallel with said first accumulated charge releasing circuit and said piezo-actuator and which comprises a second switching element, a first release of accumulated charge from said piezo-actuator being controlled according to the characteristic determined by the capacitance of said capacitor and resistance of said resistor when the first switching element of said first accumulated charge releasing circuit is in operation, and a second release of accumulate charge from said piezo-actuator being controlled by the second switching element of said second accumulated charge releasing circuit.

19. A fuel injector in accordance with claim 14 or claim 15, wherein said accumulated charge releasing section of said electric circuit comprises a plurality of circuits each having a switching element connected in series with a circuit formed by a resistor and a capacitor connected in parallel with each other and which are connected in parallel with said piezo-actuator, said capacitors and resistors in said plural parallel circuits being set so as to define an injection rate, and said switching elements in said plural parallel circuits being operated in a predetermined combination to release the accumulated charge from said piezo-actuator.

20. A fuel injector in accordance with claim 19, wherein the accumulated charge releasing circuit section of said electric circuit further comprises a charge releasing circuit having therein a switching element connected in parallel with said plural parallel circuits and said piezo-actuator, said charge releasing circuit being so arranged that after said plural parallel circuits are put into operation, the switching element in said charge releasing circuit is actuated.

21. A fuel injection system intended for use in a multicylinder internal combustion engine for supplying each of the cylinders with fuel under a high pressure, comprising:

a fuel injection pump for discharging a predetermined amount of fuel, a plurality of fuel injectors one of which is provided at each corresponding cylinder to retain under a high pressure fuel supplied from said fuel injection pump and to inject the high pressure fuel, each fuel injector comprising:

a fuel pressure control chamber and an accumulator, which temporarily retains fuel, and a path leading into the fuel pressure control chamber and accumulator to which fuel is fed intermittently under pressure from a fuel source, comprising;

a housing having formed therein a nozzle hole to inject fuel out of the accumulator;

a piezo actuator accommodated in said housing, defining said fuel pressure control chamber and expanding and contracting in accordance with a voltage applied thereto, thereby changing the volume of said fuel pressure control chamber;

a needle valve, of a type which opens and closes responsive to an applied pressure provided reciprocally movably within said housing and which, receiving pressure from said fuel pressure control chamber and accumulator, opens or blocks communication between said accumulator and said nozzle hole; and check valve means for normally closing communication between said path and said fuel pressure control chamber and between said path and said accumulator and for opening communication according to pressure in said path and/or in said fuel pressure control chamber;

the arrangement being such that fuel supplied from said fuel source passes through said path and is fed under pressure into said fuel pressure control chamber and accumulator via said check valve;

said needle valve blocking communication between said accumulator and nozzle hole when said piezo actuator expands to increase fuel pressure within said fuel pressure control chamber, and opening communication between said accumulator and said nozzle hole when said piezo actuator contracts to decrease the fuel pressure in said fuel pressure control chamber thereby allowing fuel to be injected from said nozzle hole;

a fuel pipe-line divided at a half-way point thereof into a number of branches corresponding to the number of cylinders of the internal combustion engine, having one end thereof connected to the discharge port of said fuel injection pump and each branched end thereof connected to each fuel injector, means of pressure control, provided at the half-way point of said fuel pipe-line to increase/decrease fuel pressure in the fuel pipe line, and means of opening each said fuel injector to inject high pressure fuel.

22. A fuel injection system in accordance with claim 21, wherein said fuel injection pump comprises:

a casing having an inlet port communicating with a fuel tank, a discharge port communicating with said fuel pipe-line, and a cylinder bore, a plunger provided reciprocally movably in the axial direction and rotatably about the axis within said cylinder bore to define in the cylinder bore a pressure chamber which can communicate with said discharge port, means of reciprocally moving said plunger axially, and means of rotating said plunger about said axis, said plunger having a spiral path formed in the surface thereof and having formed therein a path which provides communication between said spiral path and said pressure chamber, fuel being drawn into said pressure chamber via said inlet port when said pressure chamber is expanded, and fuel being discharged when said pressure chamber is contracted, the discharge of the fuel being terminated when said spiral path is in communication with said inlet port, the stroke of said plunger when said spiral path communicates with said inlet port being changed as said plunger is rotated about the axis, thereby varying the amount of fuel discharged.

23. A fuel injection system in accordnce with claim 22, wherein said plunger is rotatable about the axis in an interlocking relationship with an acceleration pedal.

24. A fuel injection system in accordance with claim 21, wherein said means of pressure control has a casing, and a piston accommodated slidably in the casing and which defines a pressure chamber communicating with said fuel pipe-line, said piston moving forward and backward to change the volume of said pressure chamber, whereby the fuel pressure in said fuel pipe-line is controlled.

25. A fuel injection system in accordance with claim 21, wherein said piston moves forward or backward according to the magnitude of the load on the engine to reduce the volume of said pressure chamber as the load on the engine becomes larger.

* * * * *